(12) United States Patent
Busey et al.

(10) Patent No.: US 7,746,362 B2
(45) Date of Patent: Jun. 29, 2010

(54) AUTOMATIC CALL DISTRIBUTION SYSTEM USING COMPUTER NETWORK-BASED COMMUNICATION

(75) Inventors: Andrew T. Busey, Austin, TX (US);
Mark Lovett Wells, Austin, TX (US);
Peter Novosel, Austin, TX (US); Govind Balakrishnan, Round Rock, TX (US);
Peter Bunyan, Austin, TX (US); Dwight M. Moore, Austin, TX (US); Edward C. Horvath, Austin, TX (US); Kirschen Alcyone Seah, Austin, TX (US);
Stephen P. Zilko, Austin, TX (US);
Zhiyu Zhang, Austin, TX (US); George Currie, Austin, TX (US); Mohammed Ehtesham Hoq, Austin, TX (US);
Kenneth Lynn Bowen, Austin, TX (US);
Christopher Sanchez, Austin, TX (US)

(73) Assignee: Avaya Inc., Basking Ridge, NJ (US)

( * ) Notice: Subject to any disclaimer, the term of this patent is extended or adjusted under 35 U.S.C. 154(b) by 1056 days.

(21) Appl. No.: 11/352,146

(22) Filed: Feb. 10, 2006

(65) Prior Publication Data

US 2006/0203993 A1    Sep. 14, 2006

Related U.S. Application Data

(62) Division of application No. 10/675,180, filed on Sep. 29, 2003, now abandoned, which is a division of application No. 09/209,800, filed on Dec. 11, 1998, now Pat. No. 6,665,395.

(51) Int. Cl.
*G06F 13/00* (2006.01)
(52) U.S. Cl. ...................................... 345/650; 345/594
(58) Field of Classification Search .................. 345/734
See application file for complete search history.

(56) References Cited

U.S. PATENT DOCUMENTS 4,510,351 A    4/1985    Costello et al.

(Continued)

OTHER PUBLICATIONS

Phonetastic (Pc Magazine Editors' Choice, Oct. 11, 1994).
Official Action for U.S. Appl. No. 11/351,605, mailed Jan. 6, 2010.

*Primary Examiner*—Creighton Smith
(74) *Attorney, Agent, or Firm*—Sheridan Ross P.C.

(57) ABSTRACT

Multiple communication types are integrated into a call center. The communication types can be chat, email, Internet Protocol (IP) voice, traditional telephone, web page, digital image, digital video and other types. Features of the invention include allowing a single agent to handle multiple customers on multiple channels, or "endpoints." Prioritizing and assigning calls to agents based on a specific criteria such as the number of endpoints assigned to an agent, the agents availability, the priority of a customer call, the efficiency of a given agent and the agent's efficiency at handling a particular communication type call. An agent user interface is described that allows the agent to have control over accepting multiple calls. The agent can drag and drop canned responses, images, URLs, or other information into a window for immediate display on a customer's computer. The system provides for detailed agent performance tracking. The system provides failure recovery by using a backup system. If the network server fails, then the customer is connected directly to an agent. When a failed computer comes back on line, the statistics gathered are then used to synchronize the returned computer. The system provides extensive call recording or "data wake" information gathering. The system provides flexibility in transferring large amounts of historic and current data from one agent to another, and from storage to an active agent. The system integrates human agents' knowledge with an automated knowledge base. The system provides for an agent updating, or adding, to the knowledge base in real time. The system also provides for "blending" of different communication types.

7 Claims, 16 Drawing Sheets

U.S. PATENT DOCUMENTS

| | | |
|---|---|---|
| 4,788,715 A | 11/1988 | Lee |
| 5,006,983 A | 4/1991 | Wayne et al. |
| 5,008,930 A | 4/1991 | Gawrys et al. ............... 379/210 |
| 5,020,095 A | 5/1991 | Morganstein et al. |
| 5,101,425 A | 3/1992 | Darland et al. |
| 5,163,083 A | 11/1992 | Dowden et al. |
| 5,166,974 A | 11/1992 | Morganstein et al. |
| 5,185,780 A | 2/1993 | Leggett |
| 5,206,903 A | 4/1993 | Kohler et al. |
| 5,214,688 A | 5/1993 | Szlam et al. |
| 5,291,551 A | 3/1994 | Conn et al. |
| 5,299,260 A | 3/1994 | Shaio |
| 5,309,505 A | 5/1994 | Szlam et al. |
| 5,309,513 A | 5/1994 | Rose |
| 5,333,266 A | 7/1994 | Boaz et al. |
| 5,335,269 A | 8/1994 | Steinlight |
| 5,381,470 A | 1/1995 | Cambray et al. |
| 5,390,243 A | 2/1995 | Cassleman et al. |
| 5,465,286 A | 11/1995 | Clare et al. |
| 5,469,503 A | 11/1995 | Butensky et al. |
| 5,479,487 A | 12/1995 | Hammond |
| 5,479,491 A | 12/1995 | Herrero Garcia et al. |
| 5,499,291 A | 3/1996 | Kepley |
| 5,500,795 A | 3/1996 | Powers et al. |
| 5,506,898 A | 4/1996 | Costantini et al. |
| 5,511,112 A | 4/1996 | Szlam |
| 5,524,147 A | 6/1996 | Bean |
| 5,530,740 A | 6/1996 | Irribarren et al. |
| 5,535,256 A | 7/1996 | Maloney et al. |
| 5,539,449 A | 7/1996 | Blahut et al. |
| 5,541,917 A | 7/1996 | Farris |
| 5,546,324 A | 8/1996 | Palmer et al. |
| 5,546,452 A | 8/1996 | Andrews et al. |
| 5,546,455 A | 8/1996 | Joyce et al. |
| 5,557,659 A | 9/1996 | Hyde-Thomson |
| 5,561,708 A | 10/1996 | Remillard |
| 5,563,937 A | 10/1996 | Bruno et al. |
| 5,572,677 A | 11/1996 | Luther et al. |
| 5,577,112 A | 11/1996 | Cambray et al. |
| 5,594,791 A | 1/1997 | Szlam et al. |
| 5,608,786 A | 3/1997 | Gordon |
| 5,621,789 A | 4/1997 | McCalmont et al. ........ 379/265 |
| 5,633,924 A | 5/1997 | Kaish et al. |
| 5,634,005 A | 5/1997 | Matsuo |
| 5,657,383 A | 8/1997 | Gerber et al. |
| 5,675,507 A | 10/1997 | Bobo, II |
| 5,678,002 A | 10/1997 | Fawcett et al. |
| 5,684,964 A | 11/1997 | Powers et al. |
| 5,696,809 A | 12/1997 | Voit |
| 5,696,811 A | 12/1997 | Maloney et al. |
| 5,703,943 A | 12/1997 | Otto ............................ 379/265 |
| 5,710,887 A | 1/1998 | Chelliah et al. |
| 5,717,742 A | 2/1998 | Hyde-Thomson |
| 5,721,770 A | 2/1998 | Kohler |
| 5,724,418 A | 3/1998 | Brady |
| 5,726,914 A | 3/1998 | Janovski et al. |
| 5,737,395 A | 4/1998 | Irribarren |
| 5,740,230 A | 4/1998 | Vaudreuill |
| 5,740,238 A | 4/1998 | Flockhart et al. |
| 5,740,240 A | 4/1998 | Jolissaint |
| 5,742,905 A | 4/1998 | Pepe et al. |
| 5,825,869 A | 10/1998 | Brooks et al. ............... 379/265 |
| 5,884,032 A | 3/1999 | Bateman et al. ............. 709/204 |
| 6,026,148 A | 2/2000 | Dworkin et al. .......... 379/88.18 |
| 6,044,146 A | 3/2000 | Gisby et al. ................. 379/265 |
| 6,094,673 A | 7/2000 | Dilip et al. ................... 709/202 |
| 6,125,178 A | 9/2000 | Walker et al. ............... 379/266 |
| 6,163,607 A | 12/2000 | Bogart et al. ............... 379/266 |
| 6,188,673 B1 | 2/2001 | Bauer et al. .................. 370/252 |
| 6,195,426 B1 | 2/2001 | Bolduc et al. ............... 379/266 |
| 6,212,178 B1 | 4/2001 | Beck et al. ................... 370/352 |
| 6,256,620 B1 | 7/2001 | Jawahar et al. |
| 6,282,284 B1 | 8/2001 | Dezonno et al. ........ 379/265.09 |
| 6,289,333 B1 | 9/2001 | Jawahar et al. |
| 6,295,551 B1 | 9/2001 | Roberts et al. .............. 709/205 |
| 6,665,395 B1 | 12/2003 | Busey et al. |
| 2004/0057569 A1 | 3/2004 | Busey et al. |
| 2006/0188086 A1 | 8/2006 | Busey et al. |

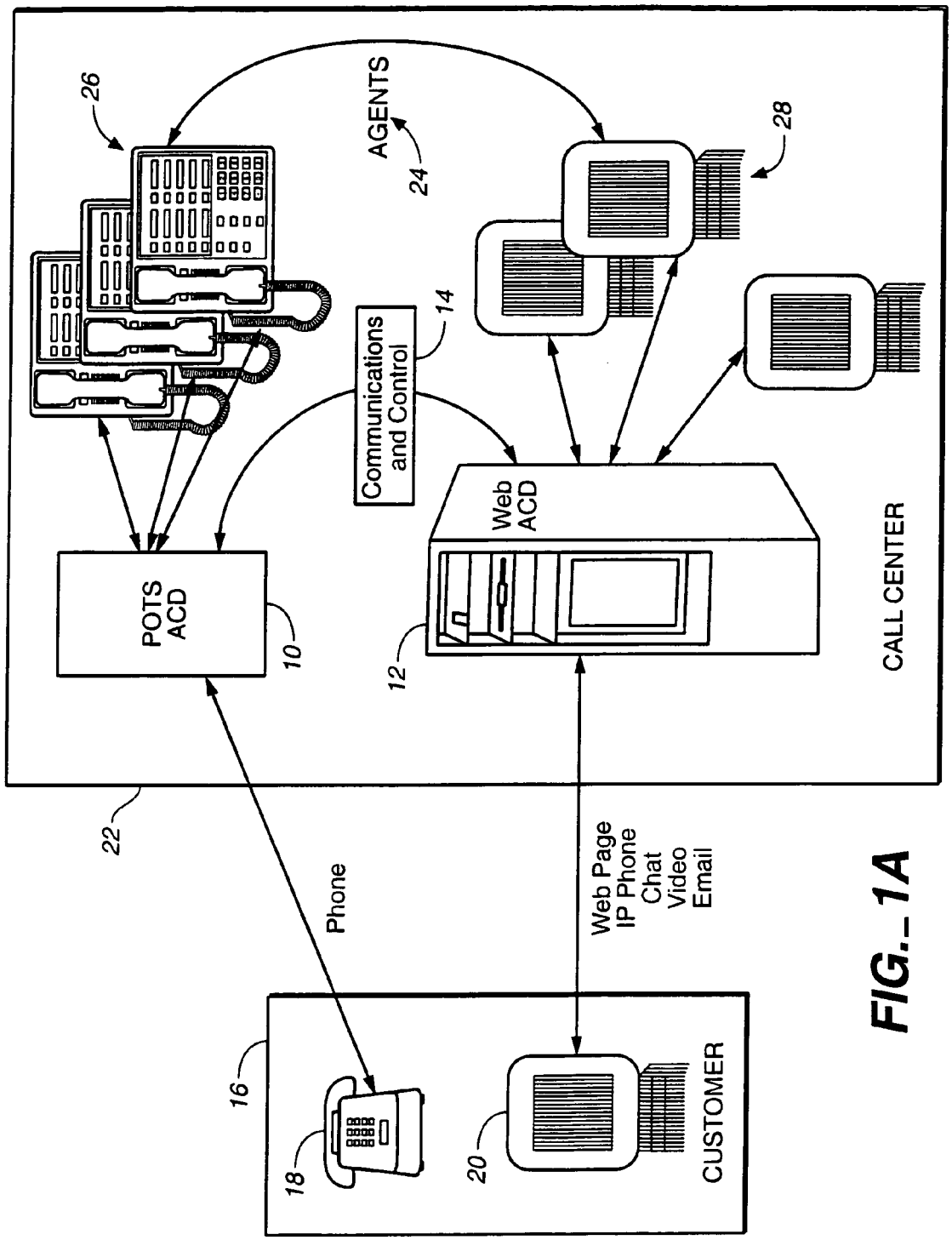
FIG._1A

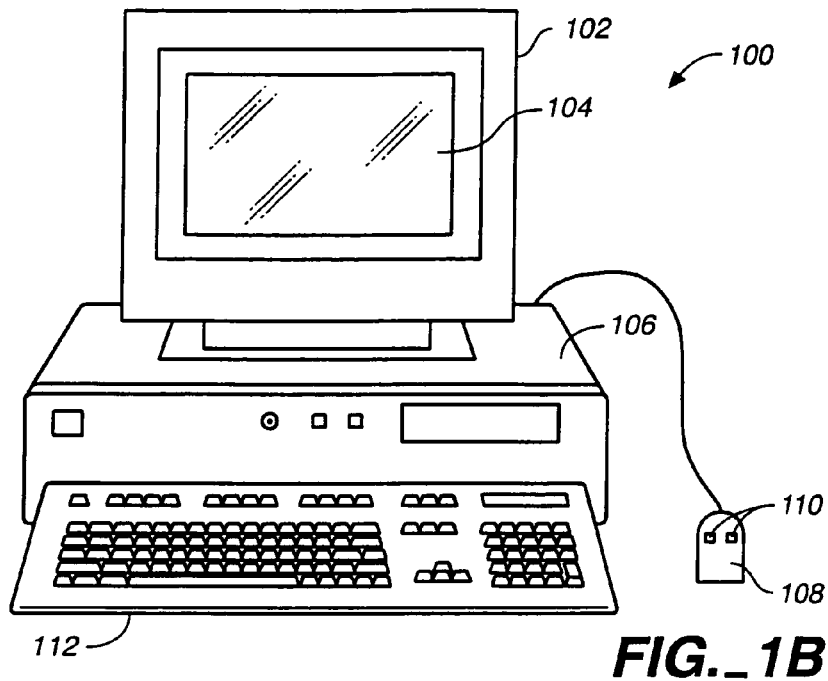
FIG._1B
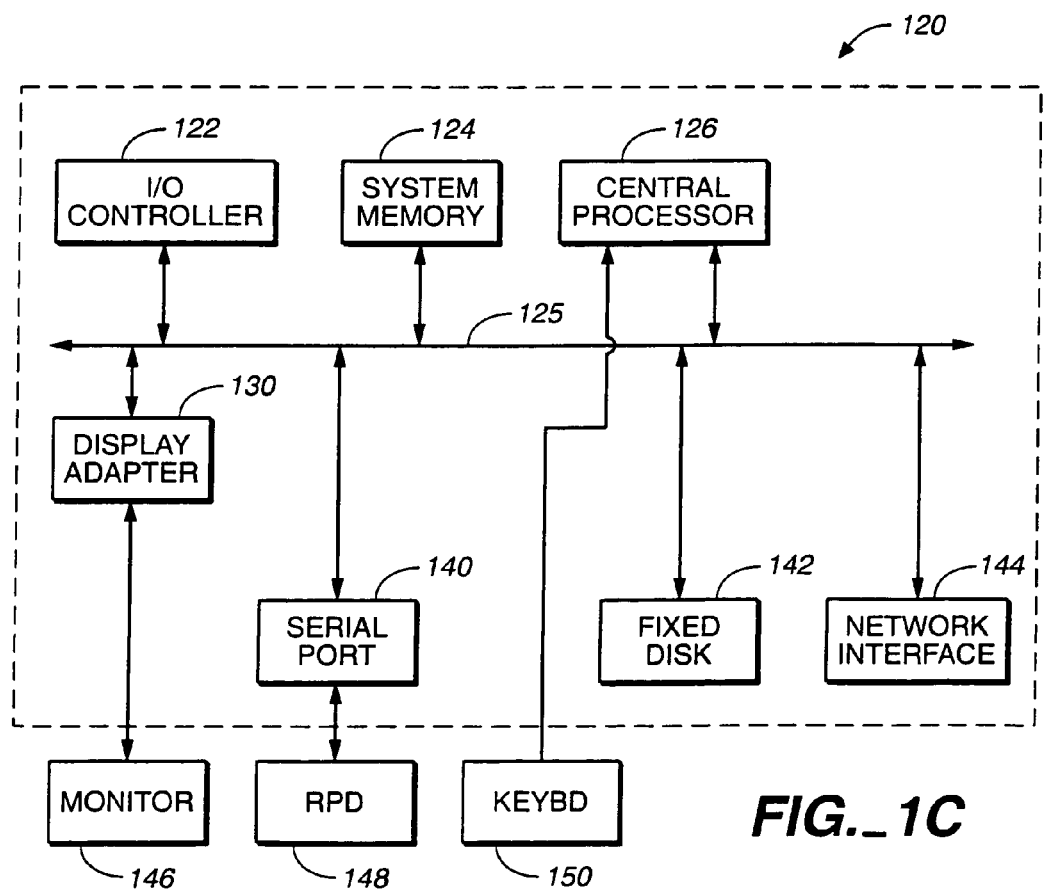
FIG._1C

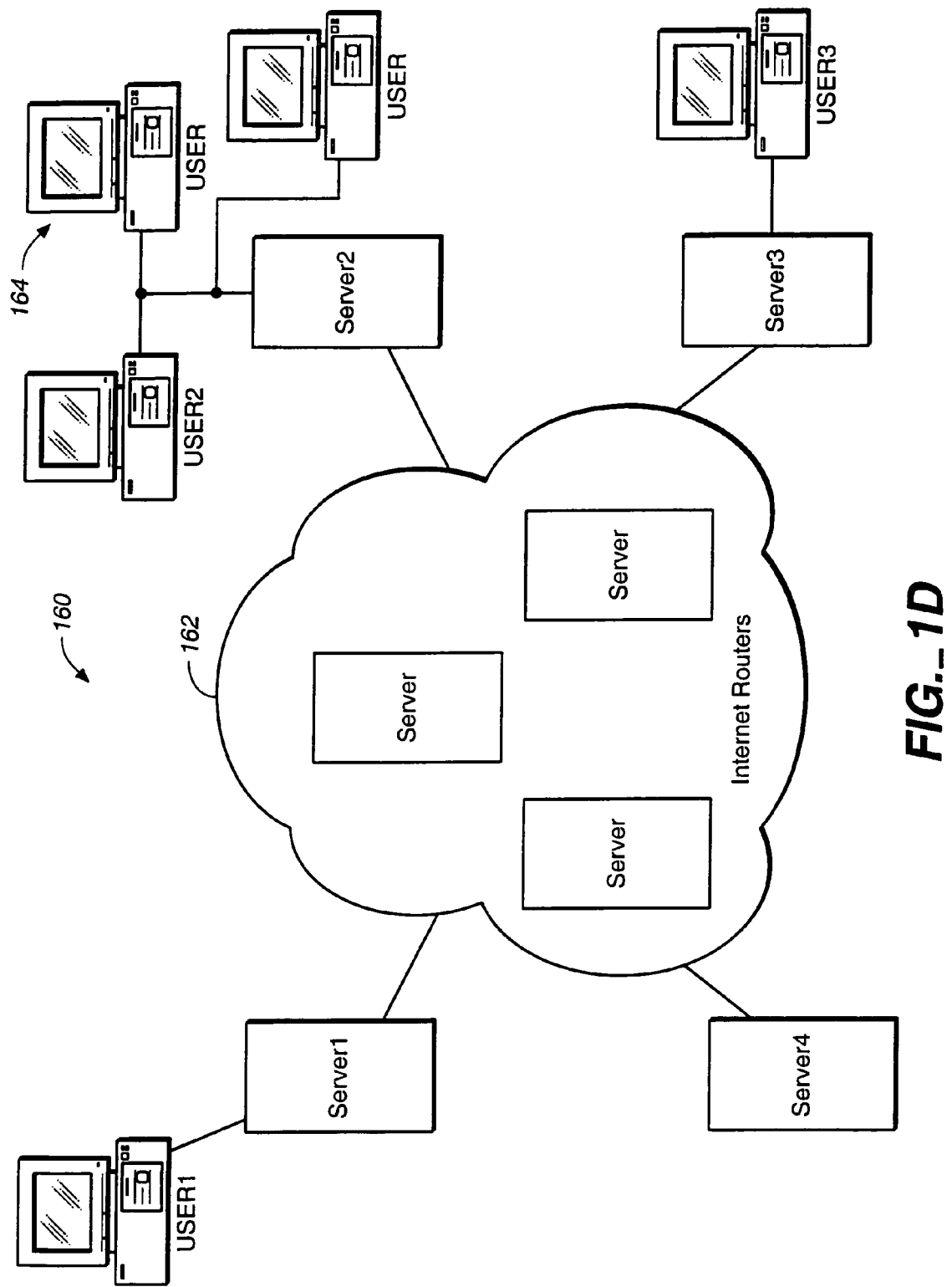
FIG._1D

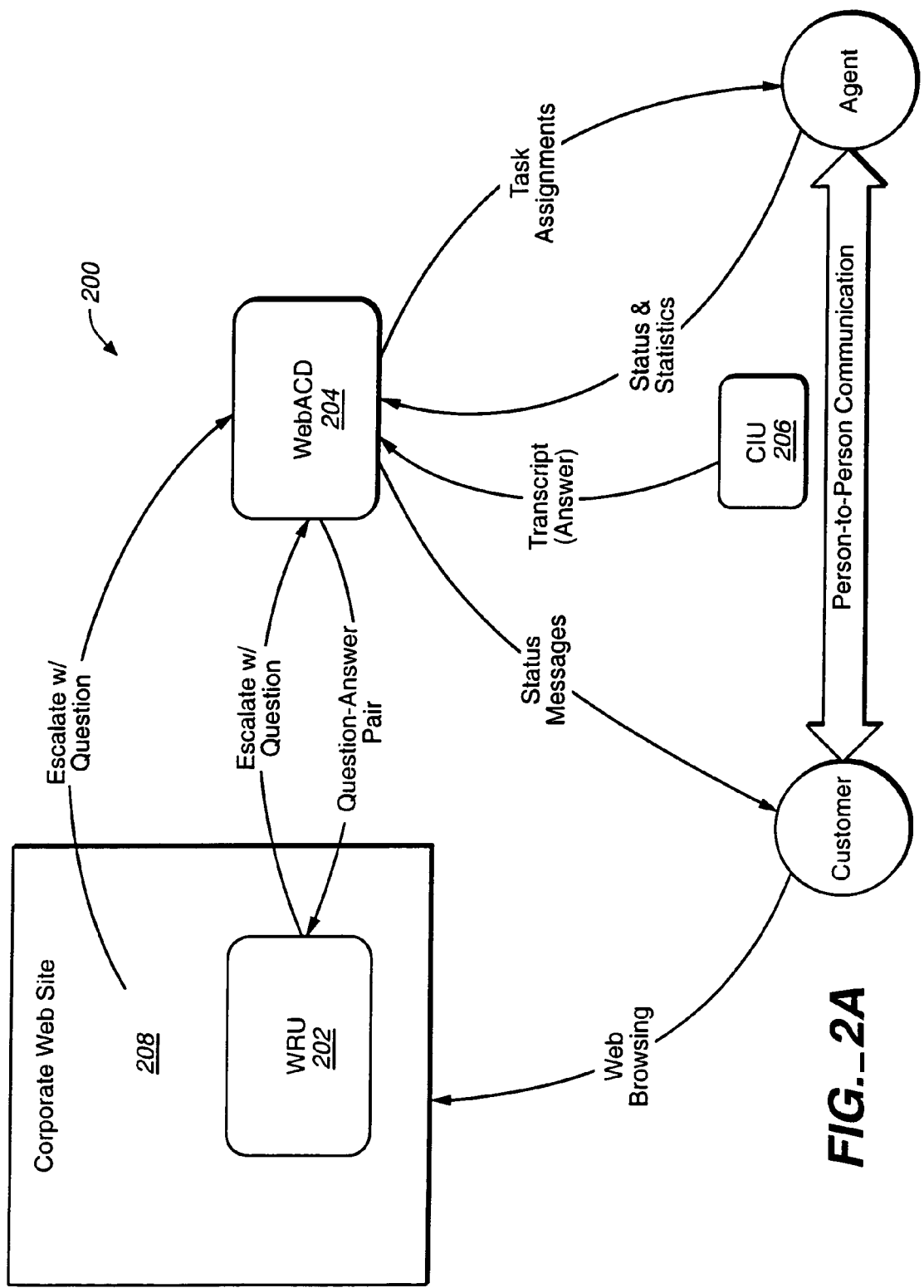
FIG._2A

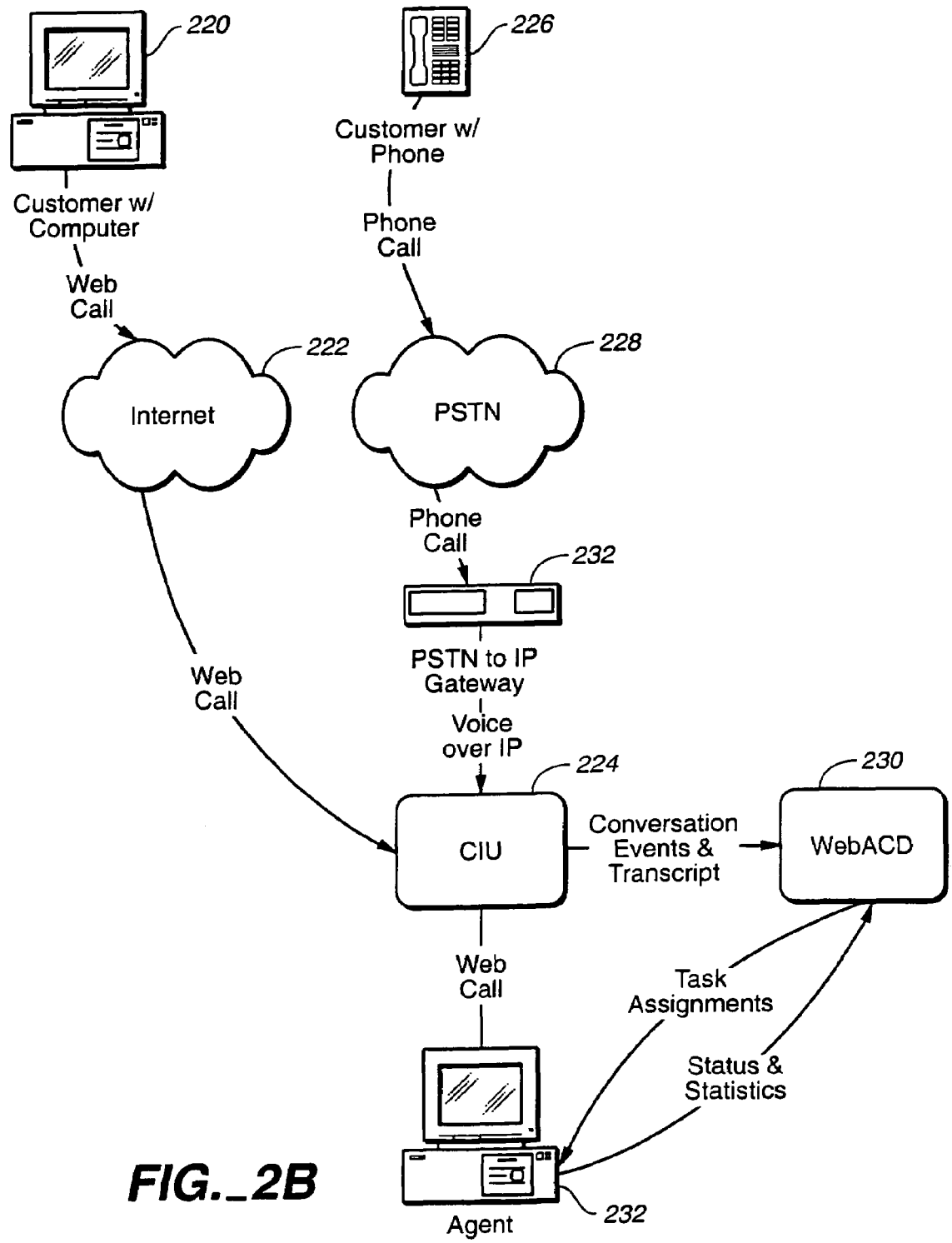
FIG._2B

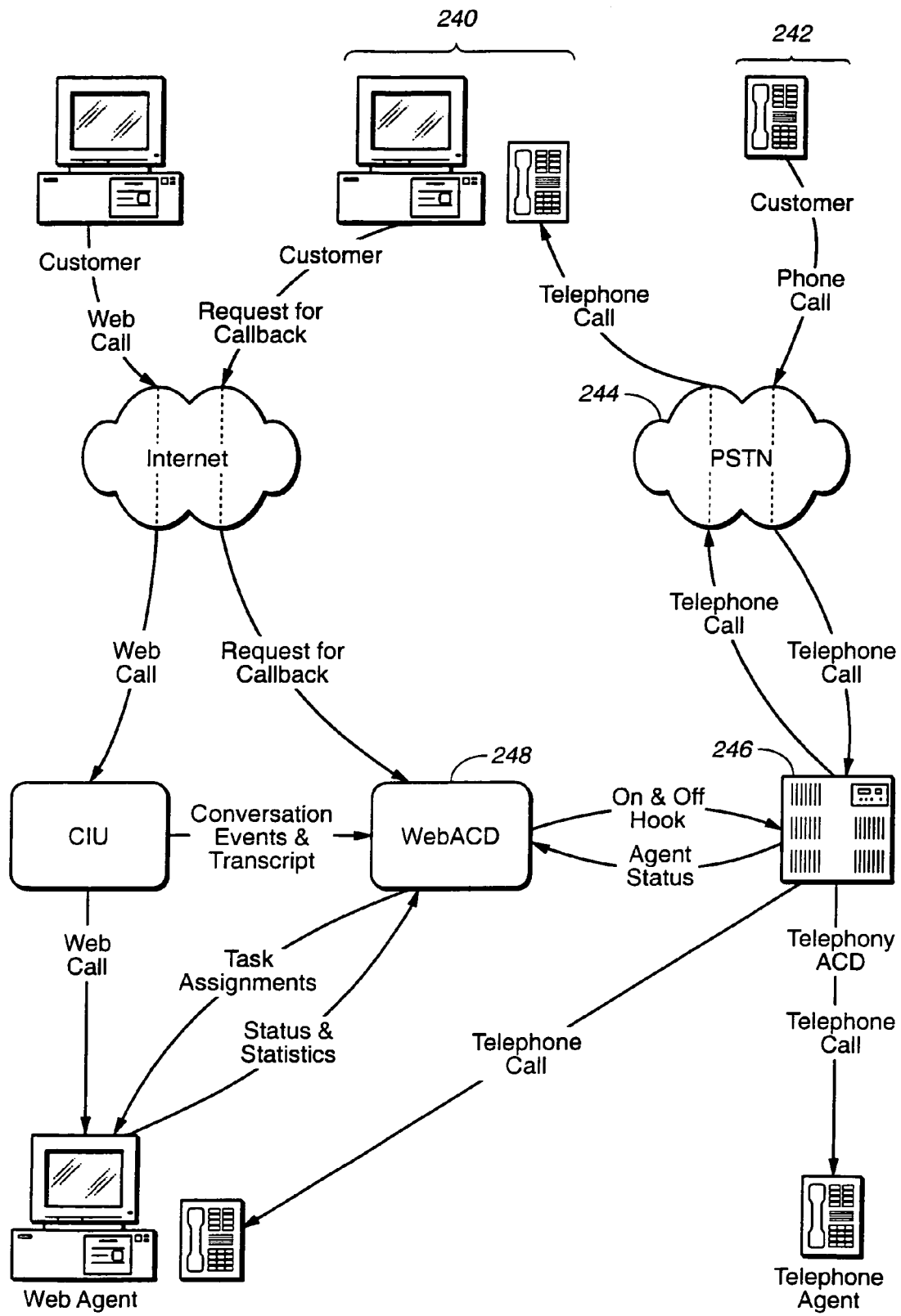
FIG._2C

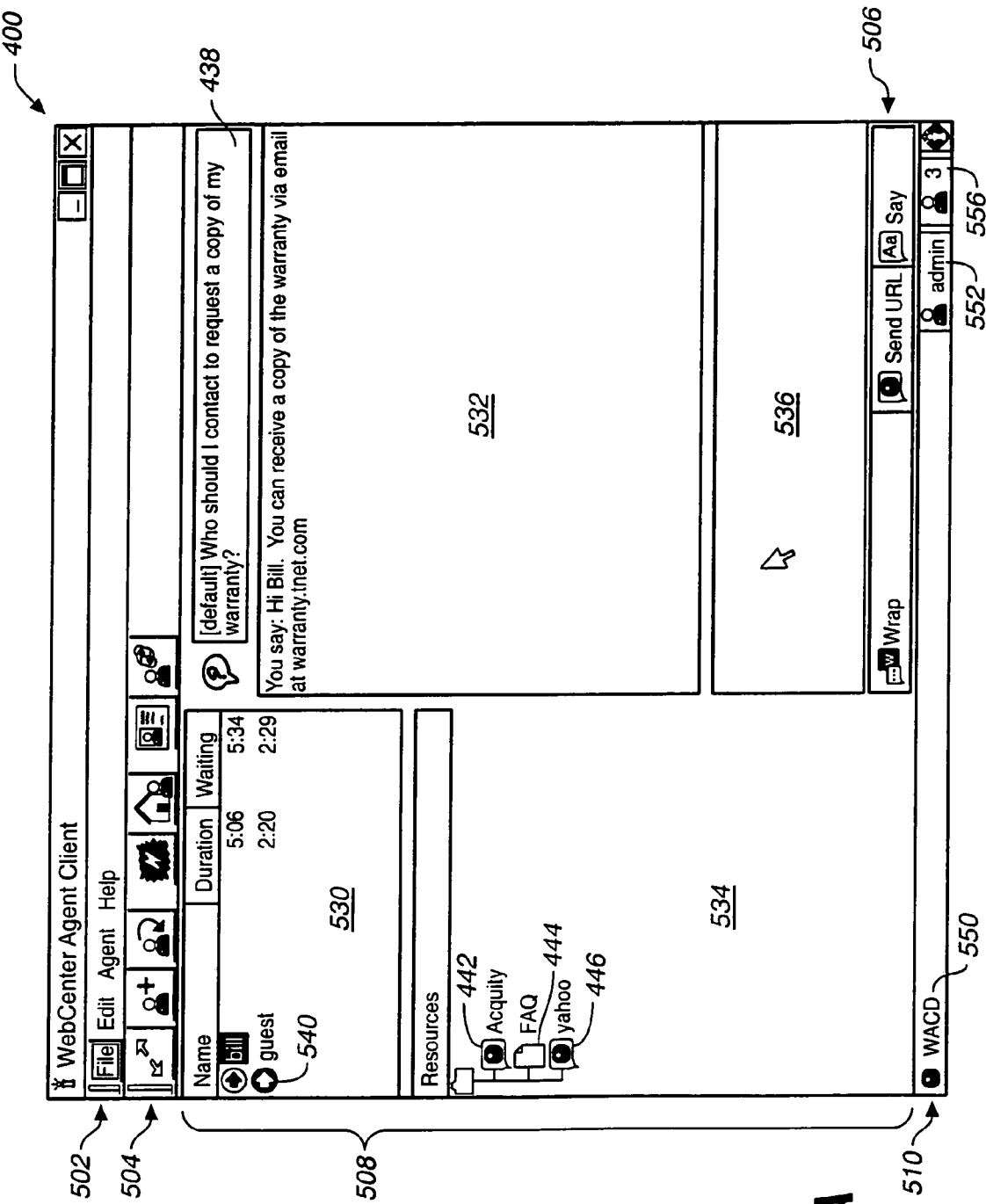
FIG._3A

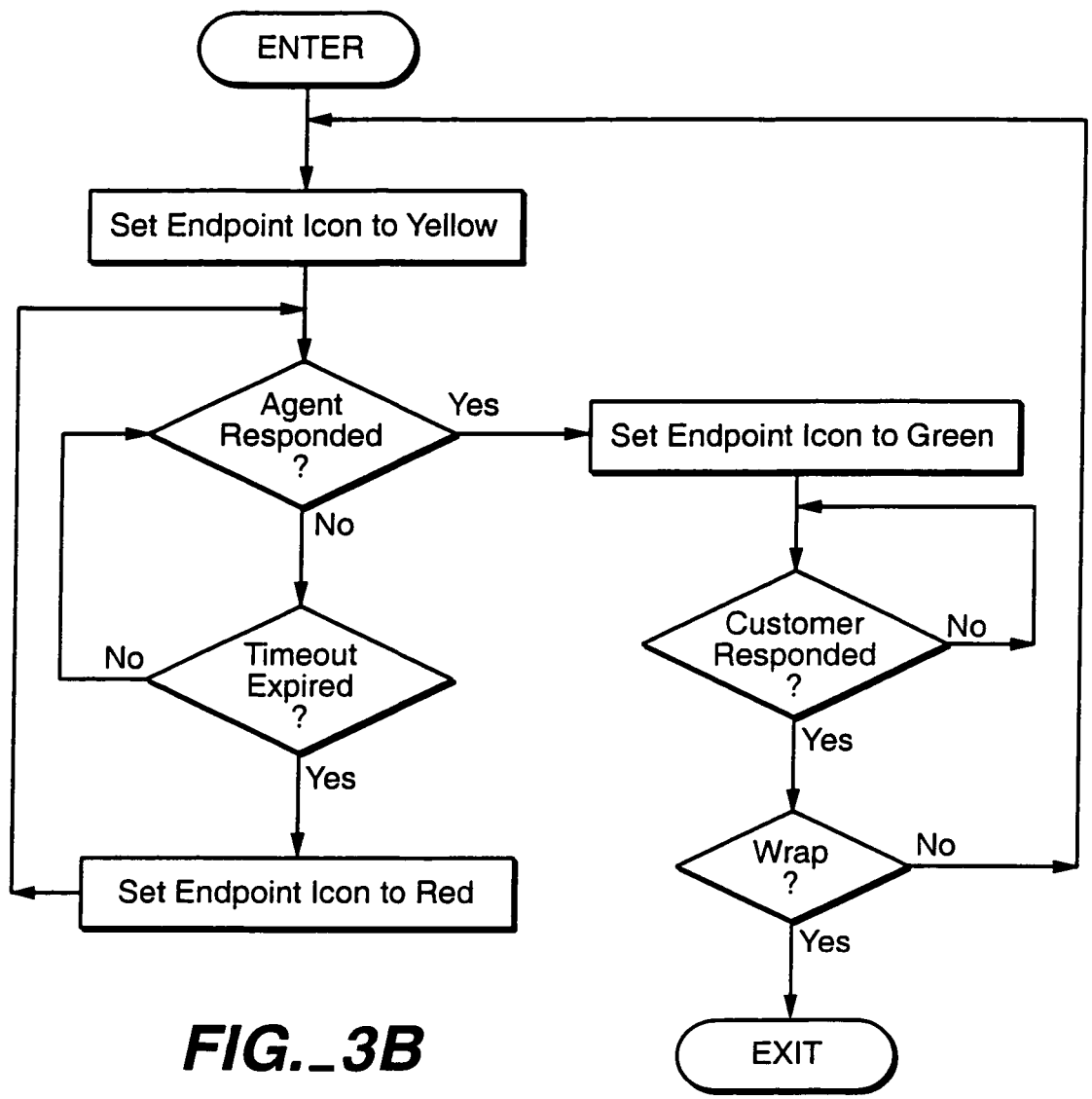
FIG._3B

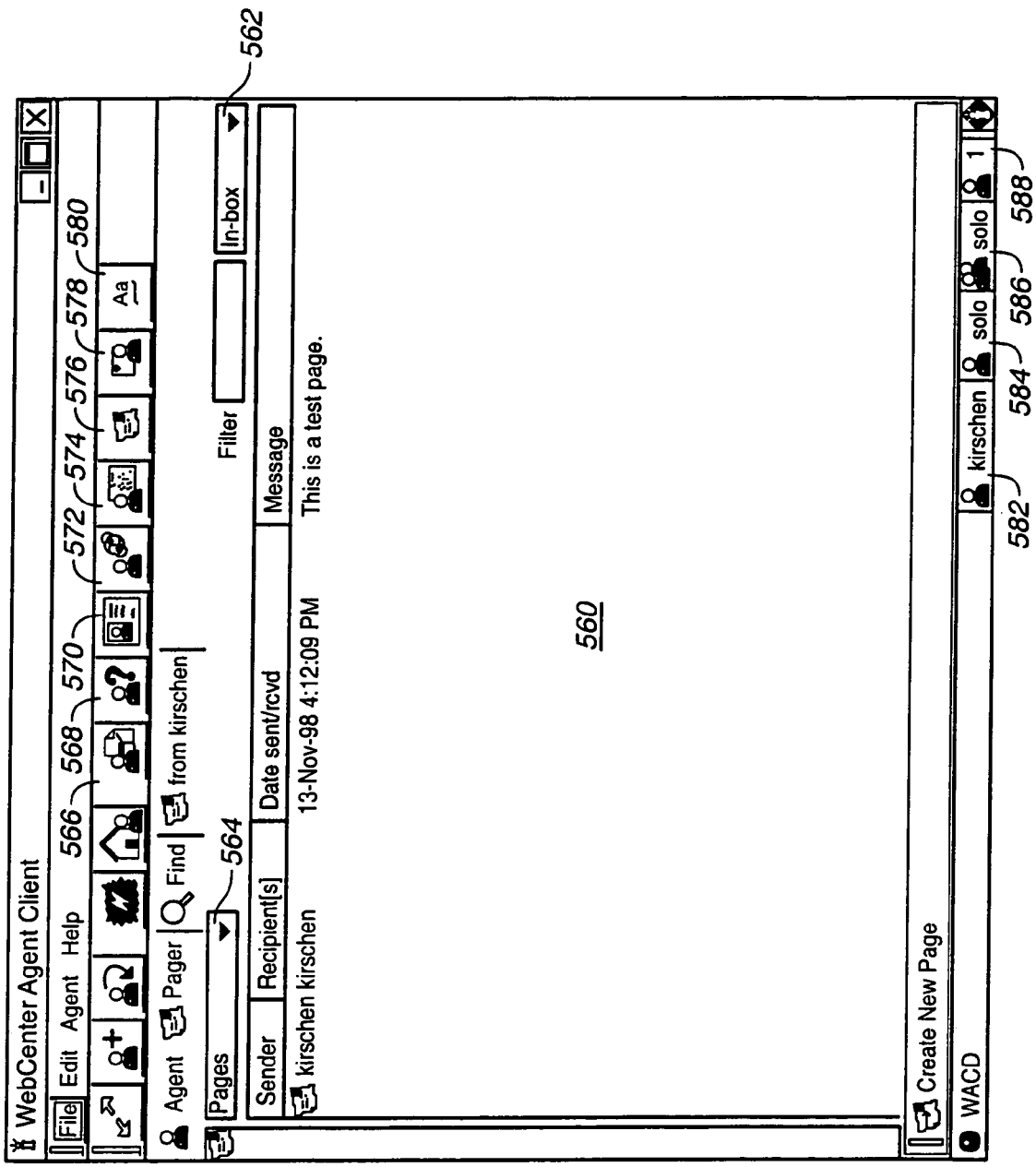
FIG._3C

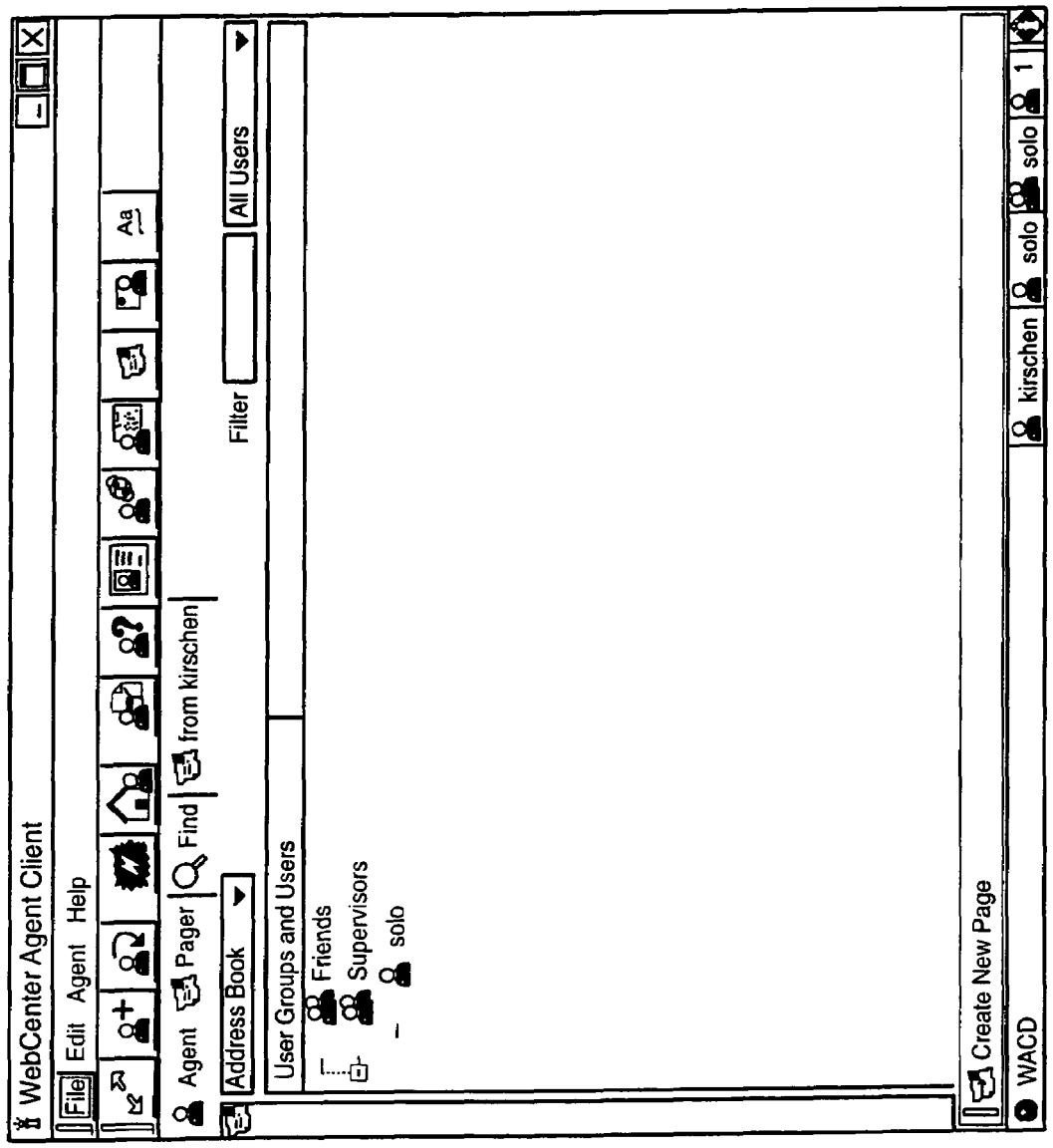
FIG._3D

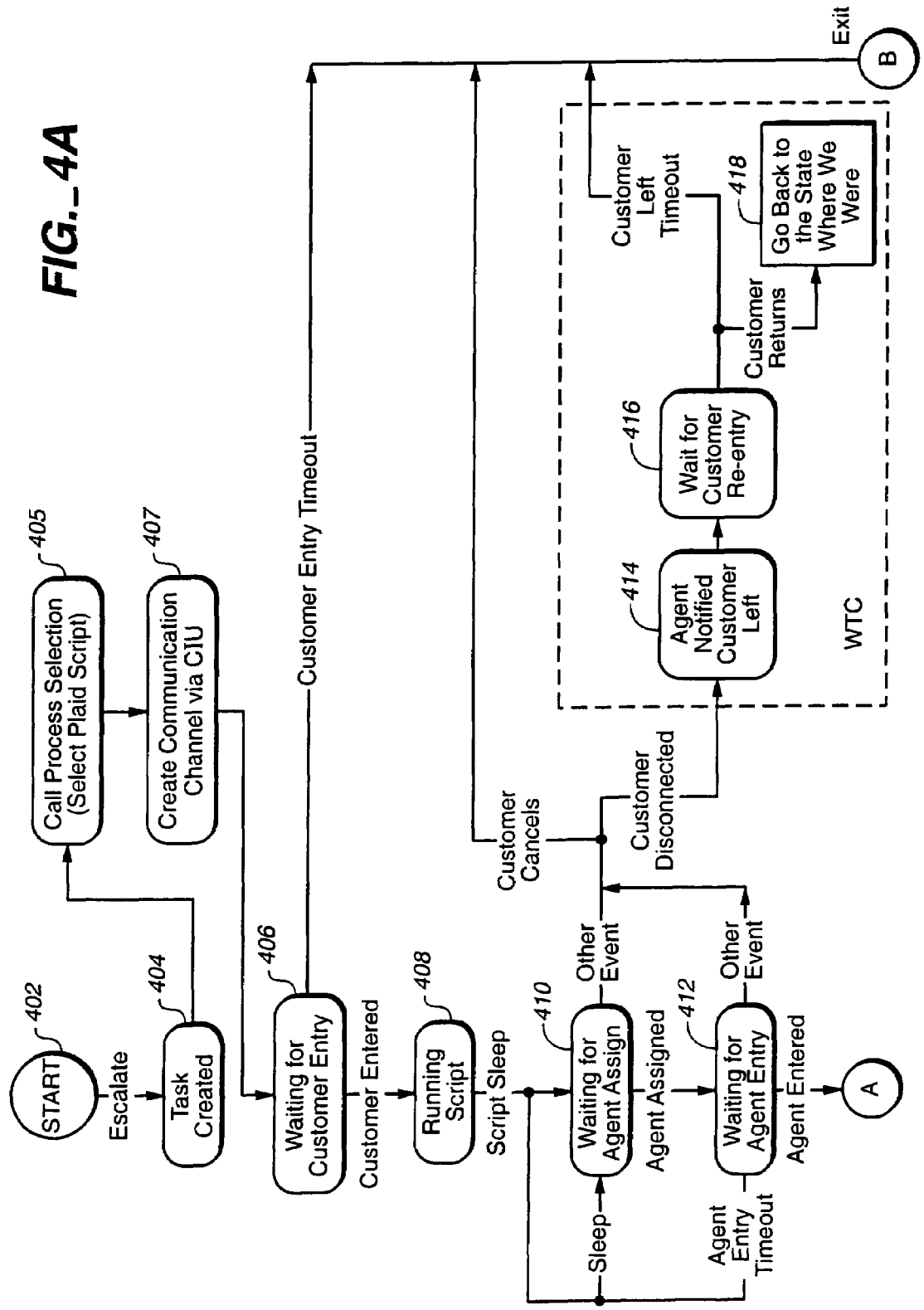
FIG._4A

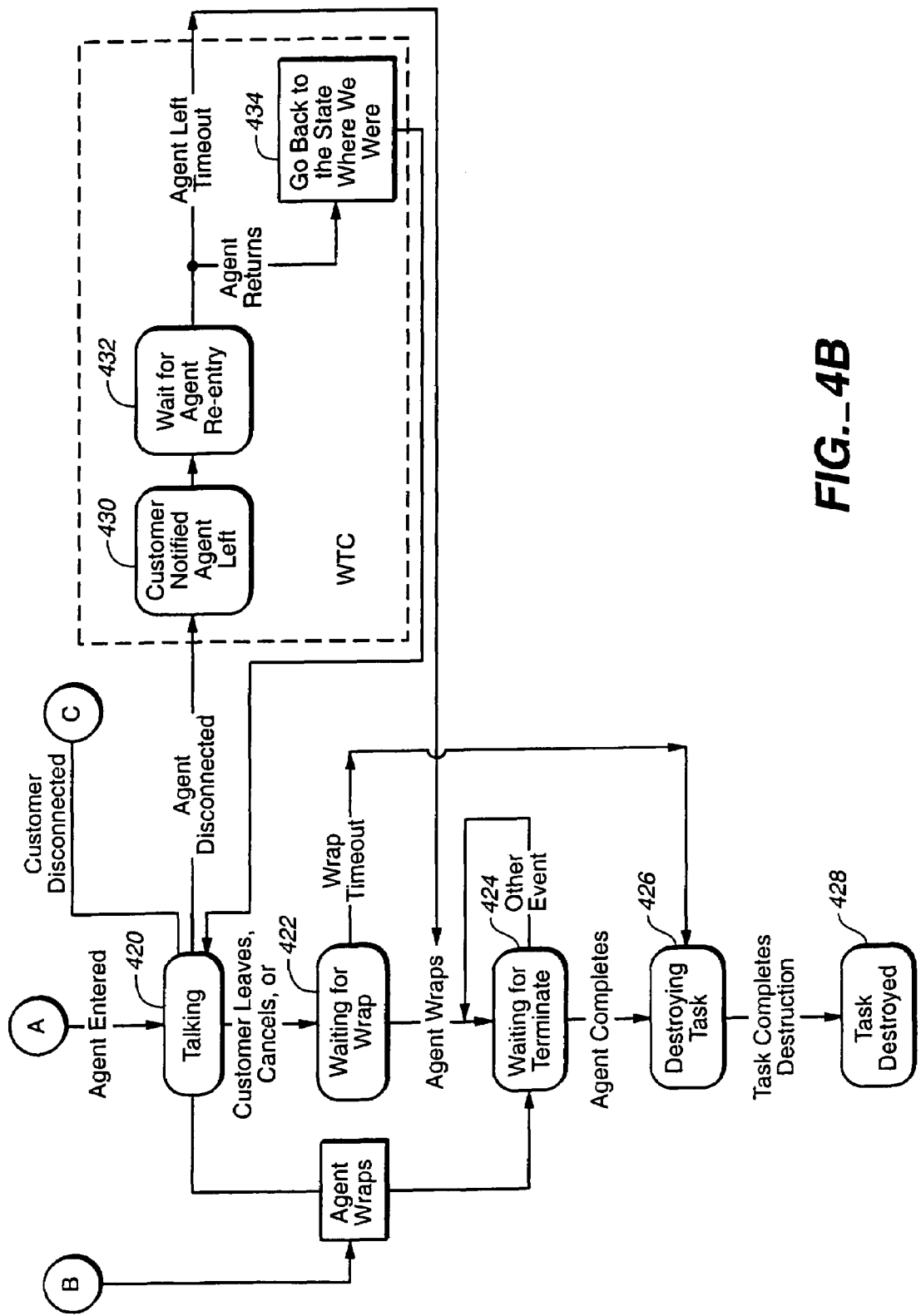
FIG._4B

FIG._5A

DailyActivityForWebACD
From 1/1/98 to 1/1/00

| Date | Number Completed | Abandon Rate | Service Level | Signed-on Agents (avg) | % Idle | % Available | % Talk | % Wrap | Queue Time (avg) | Handle Time (avg) |
|---|---|---|---|---|---|---|---|---|---|---|
| 8/19/98 | 62 | 31.1 | 93.5 | 2.52 | 0.39 | 28.98 | 70.58 | 0.04 | 00:03 | 04:10 |

FIG._5B

WebACDActivityOnDayX
Date: 8/19/98

| Start | Stop | Completed | Abandoned | Signed-on Agents (avg) | Service Level | % Idle | % Available | % Talk | % Wrap | Queue Time (avg) | Handle Time (avg) |
|---|---|---|---|---|---|---|---|---|---|---|---|
| 3:30:00PM | 4:00:00PM | 0.00 | 2.00 | 0.3 | 100.0 | 2.13 | 98.68 | -1.62 | 0.81 | 00:00 | 00:00 |
| 4:00:00PM | 4:30:00PM | 24.00 | 12.00 | 6.1 | 100.0 | 1.95 | 47.36 | 50.45 | 0.24 | 00:05 | 02:20 |
| 4:30:00PM | 5:00:00PM | 36.00 | 12.00 | 10.7 | 88.9 | 0.59 | 78.61 | 20.77 | 0.02 | 00:02 | 05:09 |
| 5:00:00PM | 5:30:00PM | 2.00 | 0.00 | 3.7 | 100.0 | 0.00 | 16.21 | 83.75 | 0.04 | 00:02 | 08:21 |
| 5:30:00PM | 6:00:00PM | 0.00 | 0.00 | 3.0 | 100.0 | 0.00 | 0.00 | 100.00 | 0.00 | 00:00 | 00:00 |
| 6:00:00PM | 6:30:00PM | 0.00 | 0.00 | 3.0 | 100.0 | 0.00 | 0.00 | 100.00 | 0.00 | 00:00 | 00:00 |
| 6:30:00PM | 7:00:00PM | 0.00 | 1.00 | 3.0 | 100.0 | 0.00 | 0.00 | 100.00 | 0.00 | 00:00 | 00:00 |
| 7:00:00PM | 7:30:00PM | 0.00 | 0.00 | 3.0 | 100.0 | 0.00 | 0.00 | 100.00 | 0.00 | 00:00 | 00:00 |
| 7:30:00PM | 8:00:00PM | 0.00 | 0.00 | 3.0 | 100.0 | 0.00 | 0.00 | 100.00 | 0.00 | 00:00 | 00:00 |
| 8:00:00PM | 8:30:00PM | 0.00 | 0.00 | 3.0 | 100.0 | 0.00 | 0.00 | 100.00 | 0.00 | 00:00 | 00:00 |
| 8:30:00PM | 9:00:00PM | 0.00 | 0.00 | 3.0 | 100.0 | 0.00 | 0.00 | 100.00 | 0.00 | 00:00 | 00:00 |
| 9:00:00PM | 9:30:00PM | 0.00 | 1.00 | 3.0 | 100.0 | 0.00 | 0.00 | 100.00 | 0.00 | 00:00 | 00:00 |
| 9:30:00PM | 10:00:00PM | 0.00 | 0.00 | 3.0 | 100.0 | 0.00 | 0.00 | 100.00 | 0.00 | 00:00 | 00:00 |
| 10:00:00PM | 10:30:00PM | 0.00 | 0.00 | 3.0 | 100.0 | 0.00 | 0.00 | 100.00 | 0.00 | 00:00 | 00:00 |
| 10:30:00PM | 11:00:00PM | 0.00 | 0.00 | 3.0 | 100.0 | 0.00 | 0.00 | 100.00 | 0.00 | 00:00 | 00:00 |
| 11:00:00PM | 11:30:00PM | 0.00 | 0.00 | 3.0 | 100.0 | 0.00 | 0.00 | 100.00 | 0.00 | 00:00 | 00:00 |

FIG._5C

DailyActivityForTaskTypeX
Task Type: lilly
From 1/1/98 to 1/1/00

| Date | Number Completed | Number Abandoned | Route Time (avg) | Queue Time (avg) | Talk Time (avg) | Wrapup Time (avg) | Tasks in Queue (avg) | Tasks Being Handled (avg) | Abandon Rate | Service Level | Longest Wait Before Abandon | Average Wait Before Abandon |
|---|---|---|---|---|---|---|---|---|---|---|---|---|
| 8/19/98 | 1 | 1 | 00:01 | 00:03 | 02:57 | 00:00 | 0:00 | 0:00 | 50.0 | 100.0 | 02:31 | 00:08 |

FIG._5D

TaskTypeXActivityOnDayY
Task Type: Default
Date: 8/19/98

| Start Time | End Time | Number Completed | Number Abandoned | Route Time (avg) | Queue Time (avg) | Talk Time (avg) | Wrapup Time (avg) | Tasks in Queue (avg) | Tasks Being Handled (avg) | Abandon Rate (%) |
|---|---|---|---|---|---|---|---|---|---|---|
| 3:30:00PM | 4:00:00PM | 0 | 1 | 00:00 | 00:00 | 00:00 | 00:00 | 0.0 | 0.0 | 100.0 |
| 4:00:00PM | 4:30:00PM | 5 | 4 | 00:03 | 00:03 | 01:21 | 00:14 | 0.0 | 0.9 | 44.4 |
| 4:30:00PM | 5:00:00PM | 5 | 1 | 00:03 | 00:02 | 08:30 | 00:00 | 0.0 | 0.9 | 16.7 |
| 5:00:00PM | 5:30:00PM | 1 | 0 | 00:05 | 00:02 | 08:20 | 00:01 | 0.0 | 1.1 | 0.0 |
| 5:30:00PM | 6:00:00PM | 0 | 0 | 00:00 | 00:00 | 00:00 | 00:00 | 0.0 | 1.0 | 0.0 |
| 6:00:00PM | 6:30:00PM | 0 | 1 | 00:00 | 00:00 | 00:00 | 00:00 | 0.0 | 1.0 | 0.0 |
| 6:30:00PM | 7:00:00PM | 0 | 0 | 00:00 | 00:00 | 00:00 | 00:00 | 0.7 | 1.0 | 100.0 |
| 7:00:00PM | 7:30:00PM | 0 | 0 | 00:00 | 00:00 | 00:00 | 00:00 | 0.0 | 1.0 | 0.0 |
| 7:30:00PM | 8:00:00PM | 0 | 0 | 00:00 | 00:00 | 00:00 | 00:00 | 0.0 | 1.0 | 0.0 |
| 8:00:00PM | 8:30:00PM | 0 | 1 | 00:00 | 00:00 | 00:00 | 00:00 | 0.0 | 1.0 | 0.0 |
| 8:30:00PM | 9:00:00PM | 0 | 0 | 00:00 | 00:00 | 00:00 | 00:00 | 0.1 | 1.0 | 100.0 |
| 9:00:00PM | 9:30:00PM | 0 | 0 | 00:00 | 00:00 | 00:00 | 00:00 | 0.0 | 1.0 | 0.0 |
| 9:30:00PM | 10:00:00PM | 0 | 0 | 00:00 | 00:00 | 00:00 | 00:00 | 0.0 | 1.0 | 0.0 |
| 10:00:00PM | 10:30:00PM | 0 | 0 | 00:00 | 00:00 | 00:00 | 00:00 | 0.0 | 1.0 | 0.0 |

FIG._5E

ActivityForAllTaskTypes
From 1/1/98 to 1/1/00

| Task Type | Number Completed | Route Time (avg) | Queue Time (avg) | Talk Time (avg) | Wrapup Time (avg) | Tasks in Queue (avg) | Tasks Being Handled (avg) | Service Level (avg) | Abandon Rate | Longest Wait Before Abandon | Average Wait Before Abandon |
|---|---|---|---|---|---|---|---|---|---|---|---|
| Default | 11 | 00:05 | 00:04 | 08:13 | 00:10 | 0.11 | 0.85 | 90.9 | 38.9 | 21:40 | 03:04 |
| lilly | 1 | 00:00 | 00:00 | 00:25 | 00:00 | 0.01 | 0.01 | 100.0 | 50.0 | 02:31 | 00:19 |
| solo | 6 | 00:04 | 00:05 | 01:40 | 00:00 | 0.00 | 0.06 | 100.0 | 25.0 | 00:00 | 00:00 |

FIG._5F

TaskForTaskTypeX
Task Type: Default
From 1/1/98 to 8/19/98

| Date | Original Task ID | Start Time | Task ID | Agent Name | Priority | Customer | Route Time | Queue Time | Talk Time | Wrapup Time | Queue Time in Threshold? | Abandoned? |
|---|---|---|---|---|---|---|---|---|---|---|---|---|
| 8/19/98 | 1-2 | 3:57:18PM | 1-2 | | 30 | mwells | 00:55 | 00:00 | 00:00 | 00:00 | Y | Y |
| | 1-3 | 3:58:49PM | 1-3 | mwells | 30 | mwells | 00:07 | 00:03 | 00:53 | 00:00 | Y | N |
| | 1-4 | 3:59:45PM | 1-4 | mwells | 30 | mwells | 00:01 | 00:06 | 00:05 | 00:01 | Y | N |
| | 1-6 | 4:06:35PM | 1-6 | mwells | 30 | mwells | 00:04 | 00:03 | 00:49 | 00:00 | Y | N |
| | 1-7 | 4:07:50PM | 1-7 | mwells | 30 | mwells | 00:01 | 00:02 | 00:22 | 00:01 | Y | N |
| | 1-8 | 4:09:54PM | 1-8 | | 30 | mwells | 01:00 | 00:00 | 00:00 | 00:00 | Y | Y |
| | | 4:20:31PM | 1-13 | | 0 | mwells2 | 00:00 | 00:00 | 00:00 | 00:00 | Y | Y |
| | | 4:20:45PM | 1-15 | | 0 | mwells2 | 00:00 | 00:00 | 00:00 | 00:00 | Y | Y |
| | 1-9 | 4:10:51PM | 1-9 | mwells | 30 | mwells2 | 00:05 | 00:03 | 20:40 | 00:01 | Y | N |
| | 1-12 | 4:18:30PM | 1-12 | nick | 30 | nick | 00:03 | 00:03 | 04:36 | 01:09 | Y | N |
| | | 4:20:42PM | 1-14 | | 0 | nick | 00:00 | 00:00 | 00:00 | 00:00 | Y | Y |
| | 1-18 | 4:36:05PM | 1-18 | mwells | 30 | mwells | 00:05 | 00:03 | 00:25 | 00:00 | Y | N |
| | 1-20 | 4:38:58MP | 1-20 | mwells | 30 | mwells2 | 00:04 | 00:03 | 09:38 | 00:01 | Y | N |
| | | 4:47:20PM | 1-22 | | 0 | mwells2 | 00:00 | 00:00 | 06:39 | 00:00 | Y | Y |
| | | 4:48:59PM | 1-23 | | 0 | mwells2 | 00:00 | 00:02 | 05:08 | 00:00 | Y | Y |
| | 1-24 | 4:52:04PM | 1-24 | nick | 30 | mwells | 00:05 | 00:02 | 08:20 | 00:01 | Y | N |
| | 1-27 | 4:57:17PM | 1-27 | nick | 30 | mwells2 | 00:05 | 21:31 | 00:00 | 00:00 | N | N |
| | 1-30 | 6:08:34PM | 1-30 | | 30 | mwells | 00:09 | 02:00 | 00:00 | 00:00 | Y | Y |
| | 1-31 | 9:20:04PM | 1-31 | | 30 | mwells | 00:59 | | | | | Y |

FIG. 5G

TeamPerformanceByTaskType
From 1/1/98 to 1/1/00

| Team | Task Type | % Idle | % Available | % Talk | % Wrapup | Signon Time (avg) | Endpoints (avg) | Number Handled (Total) | Number Handled Per Agent | Handle Time (avg) | Talk Time (avg) | Wrapup Time (avg) |
|---|---|---|---|---|---|---|---|---|---|---|---|---|
| Default | Default | 0.06 | 22.62 | 77.28 | 0.04 | 4:27:59 | 1.08 | 12 | 6.00 | 37:23 | 37:21 | 00:01 |
|  | lilly |  |  |  |  |  |  | 11 | 5.50 | 40:36 | 40:35 | 00:01 |
|  |  |  |  |  |  |  |  | 1 | 0.50 | 01:57 | 01:57 | 00:00 |
| solo | solo | 4.56 | 62.19 | 33.26 | 0.00 | 34:01 | 0.91 | 6 | 6.00 | 01:47 | 01:47 | 00:00 |
|  |  |  |  |  |  |  |  | 6 | 6.00 | 01:47 | 01:47 | 00:00 |

FIG. 5H

TeamPerformanceByAgent
From 1/1/98 to 1/1/00

| Team Name | Agent Name | Numbered Handled | Sign-on Time | Handle Time (avg) | Talk Time (avg) | Wrap Time (avg) | Endpoints (avg) | % Idle | % Available | % Talk | % Wrap |
|---|---|---|---|---|---|---|---|---|---|---|---|
| Default | mwells | 7 | 30:10 | 04:18 | 04:18 | 00:00 | 1.01 | 0.00 | 5.19 | 94.78 | 0.01 |
|  | nick | 5 | 06:43 | 00:57 | 00:56 | 00:00 | 0.31 | 0.00 | 80.33 | 19.21 | 0.12 |
| solo | ilyal | 6 | 16:47 | 00:09 | 00:09 | 00:00 | 0.57 | 3.77 | 62.19 | 33.26 | 0.00 |

FIG. 5I

TaskForAgentX
From 1/1/98 to 8/19/98
Agent: nick

| Date | Start Time | Task ID | Task Type | Priority | Customer Name | Route Time | Queue Time | Talk Time | Wrapup Time | Wait Time in Threshold? |
|---|---|---|---|---|---|---|---|---|---|---|
| 8/19/98 | 4:18:30PM | 1-12 | Default | 30 | nick | 00:03 | 00:03 | 04:36 | 01:09 | Y |
|  | 4:37:00PM | 1-19 | lilly | 30 | mwells | 00:01 | 00:03 | 02:57 | 00:00 | Y |
|  | 4:47:20PM | 1-22 | Default | 0 | mwells2 | 00:00 | 00:00 | 06:39 | 00:00 | Y |
|  | 4:52:04PM | 1-24 | Default | 30 | mwells | 00:05 | 00:02 | 05:08 | 00:00 | Y |
|  | 4:57:17PM | 1-27 | Default | 30 | mwells2 | 00:05 | 00:02 | 08:20 | 00:01 | Y |

AUTOMATIC CALL DISTRIBUTION SYSTEM USING COMPUTER NETWORK-BASED COMMUNICATION

This application is a divisional of U.S. patent application Ser. No. 10/675,180, filed Sep. 29, 2003 now abandoned which is a divisional of U.S. patent application Ser. No. 09/209,800, entitled "Automatic Call Distribution System Using Computer Network-Based Communication," filed Dec. 11, 1998, now U.S. Pat. No. 6,665,395 both incorporated by reference herein and assigned to the corporate assignee of the present invention.

COPYRIGHT NOTICE

A portion of the disclosure recited in the specification contains material which is subject to copyright protection. Specifically, portions of source code, scripting language and program model and design information appear in the specification and in the Appendix. The copyright owner has no objection to the facsimile reproduction of the specification as filed in the Patent and Trademark Office. Otherwise all copyright rights are reserved.

BACKGROUND OF THE INVENTION

Automatic call distribution centers, also called ACDs or "call centers," route telephone calls from customers: who place the calls, to agents who respond to the calls. A typical application for a call center is in a customer support department where customers seek information to assist them in using a product.

Modem call centers provide many features to make the handling of calls and exchange of information more efficient. Not only do call centers strive to assist the customers in stating and categorizing their questions, and the agents in responding to the questions, but the call centers also provide supervisors who manage the agents with information so that the supervisors can make decisions on how to best operate the call center. Also, call centers provide information to assist product manufacturers, or service providers, in improving the quality of their customer service department, particular product or service, etc.

For example, a common feature of call centers today is to allow a customer/caller to select from a menu of choices to help categorize their needs. Often, this pre-selection by the customer allows the call center to screen and categorize customers so that customers can be matched up with the proper resources to handle the calls. Call centers also have mechanisms for "queuing" the calls according to the screening information, availability of agents, etc. Call centers can also maintain a database of previous calls from the same caller, or customer. This database can be available to an agent so that an agent will be familiar with the history of the callers' problems, needs, etc. Call centers also log data on calls and call handling. For example, the time each agent spends per call may be a statistic that is of interest to a supervisor in order to judge agents' performances. Also, analysis of the types of calls being received as where, for example, recurring problems appear, can be used to identify problems in a product or service.

The products and services available in today's information age have become more complex and implicate complex technology. The knowledge necessary to use, configure and upgrade products has grown, inevitably translating into a need for more customer support. Unfortunately, today's call centers do not always provide optimum exchange of information. The almost exclusive use of the telephone as the sole communication channel between a customer and agent does not always provide flexible and efficient exchange of information. The shortcomings of today's call centers are especially deficient in light of the increasing volume of calls that call centers must handle. It is not uncommon for call centers to have hundreds of agents handling thousands of calls each day. A call center's operating overhead can be in the millions of dollars per year. The impact of a good customer support center, however, can be reflected in revenues in the hundreds of millions, thus making an efficient and effective call center vital to a company's successful operation. However, today's call centers have failed to adapt to provide an efficient exchange of information between the call center and the customers in light of to day's products and technology.

For example, it is common for computer users to download software applications, software updates, drivers, data, etc. from the Internet. In order to support these software products companies provide online documentation in the form of notes, instructions, lists of "Frequently Asked Questions" (FAQs) and other documentation. However, the Internet's presentation of information is often inadequate to ail but the most sophisticated computer and Internet users. Even when looking at a single manufacturer's website, a customer may spend a long time only to determine that the answer to their question does not exist within the wealth of information provided at the website. Customers are left to their own devices to figure out how to search among web-based information and often can not make effective automated searches because they don't know how to characterize their problems in a few keywords.

As an alternative to online documents, some manufacturers allow more customized assistance by providing, for example, an e-mail form or address to which the customer may send a question. However, in some cases, the customer may desire immediate response to which an e-mail response is not sufficient. Also, it is often awkward to state a problem without interactive communication. This is especially true with computer-related products where a discussion of a problem is often a mix of acronyms, abbreviations, syntax symbols and other peculiar uses of the written word beyond mere conversational text. Also, questions about using a user interface are difficult to state with text alone since locations, controls, objects, button presses, etc. need to be discussed.

Another form in Internet communication that is sometimes used in the customer support arena is "real-time chat," or, simply, "chat." The chat form of communication allows typed text to appear immediately on another person's screen so that two or more people may have a typed "conversation" by using their computers over a network such as the Internet. In customer support, moderated chat is another communication type that can be used to give information to customers but it represents the same type of personnel drain to the customer service provider that voice communication presents and, thus, is not a popular form of customer service support unless some screening or prioritizing can be performed. Typically, this means a customer must submit a request for a chat with an agent. In these systems, the customer is at the disadvantage of not knowing when an agent will appear and may thus have to wait online whether they desire to be in front of their computer or not.

Of course, the customer can revert to the traditional communication method of picking up the telephone and dialing a customer support center. However, this reduces the customer to voice descriptions of their problem which, in the computer and software world, may not translate well. For example, anyone who has tried to relay a long uniform resource locator (URL) by calling out the slashes and sub-domain names of text that is a collection of garbled non-words at best, and then having to verify the name when it is repeated back by the person at the other end, can understand the value of being able to use text or other images in a conversation to describe a problem. Also, many of to day's customers use their single telephone line to connect to the Internet. This means it is not possible for a customer to simultaneously converse about a problem with an Internet-related product and test out a suggested solution in real time.

Thus, it is desirable to provide a call center system that enhances the ability of a call center to exchange information with a customer. Such a call center should provide benefits in efficiency and effectiveness to both customers, agents, supervisors, and the manufacturer of a product, or provider of a service, to which the call center services are directed.

SUMMARY OF THE INVENTION

The present invention integrates multiple communication types in a call center and provides benefits when one or more communication types are used to provide a caller with information. The communication types can be chat, email, voicemail, Internet Protocol (IF) voice, traditional telephone, web page, digital image, digital video and other types. Features of the invention include allowing a single agent to handle multiple customers (endpoints) on multiple communication channel endpoints. The system prioritizes and assigns calls to agents based on a number of criteria. One criterion is the number of endpoints assigned to an agent and that agent's availability. Another criterion is the assigned priority of a customer call. Another criterion is the priority of service provided to a specific customer. Another criterion is the efficiency of a given agent. Another criterion is the agent's efficiency at handling a particular communication medium.

The agent has control over accepting calls in a multiple endpoint environment via an agent graphical user interface. Features of the agent graphical user interface include allowing the agent to drag and drop canned responses, images, URLs, or other information into a window for immediate display on a customer's computer.

The system also provides for detailed agent performance tracking. One type of performance that is tracked is the agent's performance on different communication types. The system takes into consideration how many lines or endpoints an agent had assigned to them.

The system provides failure recovery by using a backup system. If the network server fails, then the customer is connected directly to an agent in a peer-to-peer arrangement. When a failed computer comes back on line, the statistics gathered are then used to synchronize the returned computer.

The system provides extensive call recording or "data wake" information gathering. The system provides flexibility in transferring large amounts of historic and current data (Datawake™ brand information gathering) from one agent to another, and from storage to an active agent.

The system integrates human agents' knowledge with an automated knowledge base. The system provides for an agent updating, or adding, to the knowledge base in real time. The system also provides for "blending" of different communication types. For example, HTML can be included with chat-text so that, for example, a URL can be provided that can be clicked on to take a customer to a specific website. Agents may be allocated to different communication types as, for example, where agents handling telephone calls are reallocated to handle web requests where web requests communication type calls suddenly increase in frequency.

In one embodiment, the invention provides an automatic call distribution system for transferring information between customers and agents, the automatic call distribution system includes a network interface for transferring information between customers and agents through a computer network; and a control system for simultaneously assigning a plurality of customers to a single agent through one or more of the interfaces.

DESCRIPTION OF THE DRAWINGS

FIG. 1A shows an overview of the call center of the present invention;

FIG. 1B is an illustration of a computer system suitable for use with the present invention;

FIG. 1C illustrates subsystems that might typically be found in a computer such as the computer of FIG. 1B;

FIG. 1D is a generalized diagram of a typical network;

FIG. 2A shows the major components and basic information flow in the WebCenter of the present invention;

FIG. 2B illustrates details of the "voice over IP" communication type of call in the WebACD;

FIG. 2C illustrates a configuration of the WebCenter where standard telephone calls are handled by a telephony ACD;

FIG. 3A shows agent client main screen 400 as it appears on an agent's computer system display;

FIG. 3B shows a flowchart depicting the color cue transitions for endpoint icons described above;

FIG. 3C shows the "pager" display of the agent interface;

FIG. 3D shows the address book display;

FIG. 4A shows a first portion of a flowchart, or state machine, describing events in the WebACD of the present invention;

FIG. 4B shows a second portion of the flowchart of FIG. 4A;

FIG. 5A is a first example of a report;
FIG. 5B is a second example of a report;
FIG. 5C is a third example of a report;
FIG. 5D is a fourth example of a report;
FIG. 5E is a fifth example of a report;
FIG. 5F is a sixth example of a report;
FIG. 5G is a seventh example of a report;
FIG. 5H is a eighth example of a report; and
FIG. 5I is a ninth example of a report.

DETAILED DESCRIPTION OF THE PRESENT INVENTION

FIG. 1A illustrates the overall concept of the present invention. In FIG. 1A, plain old telephone system automatic call distribution (POTS/ACD) system 10 provides a telephone interface. POTS/ACD system 10 is integrated with other forms of communication such as those provided by a computer network. Specifically, the network can be the Internet using the World Wide Web (WWW or simply "Web") protocol defined, in part, by hyper-text markup language (HTML) pages. Communication types can be, for example, web pages, so-called Internet Protocol (IP) voice communication (such as that defined by International Telecommunications Union (ITU) recommendation H.323 (02/98)), packet-based multimedia communications systems, chat, video and e-mail. Any number or combination of these communication types can be used in different configurations of the present invention. Specifically, one or more of the network communication types can be used in a call center of the present invention without the need for a telephone interface. The network interface is shown as WebACD 12. The communication types provided by POTS/ACD 10 and WebACD 12 are used and controlled by communications and control 14. As discussed below, communications and control 14, along with other processes, devices, etc., as described, serve to perform the features and functions of the present invention. Many of these processes and devices are not specifically shown in FIG. 1A, which only illustrates the broad concepts of the present invention.

Customer Site 16 includes telephone 18 for standard-type voice communication. Customer site 16 also includes a computer 20 for network types of communication. Each of these communication types is discussed in detail below. Other communication types are possible and can be suitable with embodiments of the invention. It will be apparent that present, and future communication types can be substituted, or added to, the communication types discussed herein with many of the same mechanisms and features that apply to the listed communication types also being applicable to communication types not specifically discussed.

FIG. 1A shows Call Center 22 including POTS/ACD 10, WebACD 12 and communications and control 14. The coordination of these systems allows human agents at 24 to respond to customer inquiries, requests, and other needs, via telephone communication represented at 26 and network-based communication types at 28 via the use of telephones and computers, respectively. Additionally, the system provides automated information where, by the use of a knowledge base or other data exchange, the customer is provided with information without requiring the participation of a human agent.

The details of the present invention will be described in connection with the Figures as follows: Section 1 describes hardware suitable for use with the present invention; Section 2 provides a system overview of the invention; Section 3 describes in detail those portions of the system that allow callers to obtain information without the aid of an agent; Section 4 describes in detail those portions of the system that allow callers to be assigned to, and interact with, agents; Section 5 details the data-logging capability of the present invention; Section 6 explains the scripting control language; and Section 7 describes agent performance monitoring.

1. Description of Hardware

FIG. 1B is an illustration of computer system 100 including display 102 having display screen 104. Cabinet 106 houses standard computer components (not shown) such as a disk drive, CDROM drive, display adapter, network card, random access memory (RAM), central processing unit (CPU), and other components, subsystems and devices. User input devices such as mouse 108 having buttons 110, and keyboard 112 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 1C illustrates subsystems that might typically be found in a computer such as computer 100.

In FIG. 1C, subsystems within box 120 are directly interfaced to internal bus 128. Such subsystems typically are contained within the computer system such as within cabinet 106 of FIG. 1B. Subsystems include input/output (I/O) controller 122, System Memory (or "RAM") 124, CPU 126, Display Adapter 130, Serial Port 140, Fixed Disk 142, Network Interface Adapter 144. The use of bus 128 allows each of the subsystems to transfer data among subsystems and, most importantly, with the CPU. External devices can communicate with the CPU or other subsystems via bus 128 by interfacing with a subsystem on the bus. Thus, Monitor 146 connects with Display Adapter 130, a relative pointing device (e.g. a mouse) connects through Serial Port 140. Some devices such as Keyboard 150 can communicate with the CPU by direct means without using the main data bus as, for example, via an interrupt controller and associated registers.

As with the external physical configuration shown in FIG. 1B, many subsystem configurations are possible. FIG. 1C is illustrative of but one suitable configuration. Subsystems, components or devices other than those shown in FIG. 1C can be added. A suitable computer system can be achieved without using all of the subsystems shown in FIG. 1C. For example, a stand alone computer need not be coupled to a network so Network Interface 244 would not be required. Other subsystems such as a CDROM drive, graphics accelerator, etc. can be included in the configuration without affecting the performance of the system of the present invention.

FIG. 1D is a generalized diagram of a typical network.

In FIG. 1D, network system 160 includes several local networks coupled to the Internet. Although specific network protocols, physical layers, topologies, and other network properties are presented herein, the present invention is suitable for use with any network.

In FIG. 1D, computer USER1 is connected to Server1. This connection can be by a network such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet is shown symbolically as a collection of server routers 162. Note that the use of the Internet for distribution or communication of information is not strictly necessary to practice the present invention but is merely used to illustrate a preferred embodiment, below. Further, the use of server computers and the designation of server and client machines is not crucial to an implementation of the present invention. USER1 Computer can be connected directly to the Internet Server1's connection to the Internet is typically by a relatively high bandwidth transmission medium such as a T1 or T3 line.

Similarly, other computers at 164 are shown utilizing a local network at a different location from USER1 computer. The computers at 164 are coupled to the Internet via Server2. USER3 and Server3 represent yet a third installation.

2. System Overview

The present invention is embodied in a product called WebCenter™, manufactured and distributed by Acuity, Corp. The WebCenter design includes three distinct subsystems referred to as the Web Response Unit (WRD), WebACD and Communications Interface Unit (CIU).

The WRU handles initial customer interaction with the system. The WRU allows a customer to obtain information independently, such as by querying a database, compilation of Frequently Asked Questions (FAQ) or other information source. The WRU manages the customer login process, provides for self-help searching of knowledge bases, tracking of customer issues and their resolution. The WRU provides interfaces for connection with other data systems' databases for knowledge searches. If the customer cannot find the appropriate information from the WRU then the customer can escalate to the WebACD and talk to a live agent.

Once a customer call has been escalated, the WebACD manages interaction between customers and agents, forwards unresolved issues to human agents and routes customer requests for agent interaction. The WebACD supports interfaces to traditional ACD systems allowing those call center agents to operate in both telephony and Web support roles. Links to these traditional ACD systems will allow the WebCenter to mark agents as "busy" when they are handling Web-based issues, and streamline the agent tracking process by using the ACD system agent ID numbers for identification and authentication.

The CIU manages the physical communications channels between customers and agents. In a preferred embodiment, the CIU module provides real-time text discussion, or chat, with multimedia extensions allowing agents and customers to interact immediately to solve a particular problem. The CIU also provides a number of interfaces to extension modules, including computer-telephony integration (allowing customers to request a telephone call-back) and H.323 (I.e., "voice packet," or "packet over IP") to PBX integration. The latter function allows agents to speak with a customer via their telephone handset, while the customer uses an internet phone (H.323 compliant software) on their end of the connection.

FIG. 2A shows the major components and basic information flow in the WebCenter of the present invention.

In FIG. 2A, WebCenter 200 includes the major components discussed above, namely WRU 202, WebACD 204 and CIU 206. Typically, a WebCenter is implemented on one or more computers, servers or other processing devices equipped with appropriate communications devices as discussed herein. For example, FIG. 2A shows WRU 202 as executing within a corporation's website. This can mean that the web page interface to the WRU is linked from another page on the corporate web site and that the same servers that handle the corporate web site also implement the WRU. However, it should be apparent that although the architecture of the WebCenter is presented throughout this specification in terms of specific computers, communication devices, processes, etc., that many arrangements are possible. For example, the web-based nature of the WRU interface to the customer means that the WRU's processes can be executing at one or more remote computers that don't have to be local to any other processes or processors in the WebCenter or corporate website. Also, the customer can access the WRU interfaces, and other interfaces of the WebCenter (i.e., "customer interfaces," discussed below) from any computer system that supports a web browser. Similarly, agent interaction with the WebACD portion of the system is web-based so that the same features of remote accessibility and distributed processing apply.

FIG. 2A illustrates the basic flow of information between the WRU, WebACD and CIU components and between a Customer and Agent.

Events such as a customer call or other form of question origination can be from the WRU, specifically, or the corporate web site in general. For example, a customer may be browsing the corporate web site for information and can access information through the WRU. Some of the customer inquiries can be handled in an automated fashion through databases where the customer interacts with a process. At some point the WRU may determine that the customer's inquiry needs to be serviced by interaction with a human agent. At this point the inquiry is escalated to WebACD 204. Similarly, events can be escalated from other sources in the corporate website directly to the WebACD where agent assistance is needed as shown by the arrow from corporate web site 208 to WebACD 204. In general, events are escalated when the information exchange needs to be more interactive. Once an inquiry or event is escalated to the WebACD it is referred to as a "call."

Calls are queued within the WebACD and are assigned to agents based on numerous factors including the type of communication (e.g., chat, email, voice, web-page, IP voice), availability of agents, agent efficiency with respect to a communication type, and customer priority rating. When an agent successfully answers a question in certain types of communication, such as email, the answer is provided to the customer and may also be used to update a database so that the answer can be provided in an automated fashion the next time the same or similar question is asked.

FIG. 2A shows that the WebACD sends status messages to the customer. These messages inform the customer as to their position in a queue while waiting for their call to be assigned to an agent. Agents are informed of the existence of a pending call, are informed of details of the call and are alerted if a call has been pending for a long time. Agents are assigned tasks, or calls, by the WebACD. Statistics on agent performance are collected by the ACD for monitoring and performance review purposes. The statistics are used to generate reports for agent supervisors, and for other management purposes. In cases where an agent and customer communicate via a communication type that can be easily recorded, such as chat, the CIU can record the entire transcript (or a portion) of the dialogue and transfer the transcript to the WebACD for storing and future reference. Other communication types can be recorded, also, such as voice or IP voice. This can be accomplished by audio recording, by speech recognition, etc.

FIG. 2B illustrates details of the "voice over IP" communication type of call in the WebACD.

In FIG. 2B, a customer's speech is picked up by, e.g., a microphone coupled to a sound card in computer 220. The digitized speech is transferred over Internet 222 to CIU 224 which acts as the interface between the WebCenter and a customer with respect to voice calls. CIU 224 handles routing of voice calls to an agent such as at agent computer station 232, sends a record of conversation events and transcripts to WebACD 230, and is controlled by WebACD 230 in accordance with queuing of customer calls and assignment of agents as discussed, above, in connection with FIG. 2A.

FIG. 2B also illustrates how a standard telephone call is handled in the WebCenter. A customer uses a standard telephone 226 to place a call through PSTN 228. This call is received at the WebCenter and is converted to "voice over IP" by gateway 232. The converted voice data is sent to CIU 224. Thus due to the conversion, standard telephone transmissions can be handled identically with "voice over IP" transmissions. This provides the WebCenter with greater control of voice calls and allows the same software to be used to handle both types of voice calls. Also this allows an agent to be able to remotely handle calls in an identical manner with agents located at the customer service site. All that is needed is that an agent have access to a computer with audio input/output capability. Note that in the configuration shown in FIG. 2B. the agent can respond to voice calls (whether originated through PSTN or "voice over IP") from a microphone and speaker built into agent computer system 232.

FIG. 2C illustrates a configuration of the WebCenter where standard telephone calls are handled by a Telephony ACD. This is useful in cases where a company already has expensive telephony ACD equipment installed. The configuration of FIG. 2C allows handling of new communication types to be added into existing traditional call centers.

In FIG. 2C, customers at 240 and 242 have telephones that connect to PSTN 244. Customer initiated calls through PSTN 244, unlike telephone calls in FIG. 2B, are not converted to "voice over IP" format. Instead, the calls remain in the standard telephone domain and are answered by a traditional telephony ACD 246 which routes the calls to an agent's telephone under control of ACD 246. The configuration of FIG. 2C also allows a customer to place a request for a "callback" from the customer's computer for example, from the computer at 240. The WebACD performs the request for callback. When the call is assigned to an agent, WebACD instructs telephony ACD 246 to dial the customer at 240. When the customer answers the telephone the assigned agent is put in telephone communication with the customer.

3.A The WebACD

FIG. 4A shows a first portion of a flowchart, or state machine, describing events in the WebACD portion of the present invention. In FIG. 4A, the flowchart is entered at step 402 where it is assumed that a customer needs to be placed in contact with a human agent in the call center. This can occur, for example, where a customer clicks on a "live help" button on a web page generated by the as WRU discussed above.

At step 404 a software task is created to handle the customer-to-agent assignment. For example, where a customer is destined to enter into a chat or voice-over-IP session with an agent the task is an instance of a session that assigns the customer and agent to the appropriate resources and serves to track the session and log appropriate data. Such a session can be launched by an agent who is viewing a list of open tasks, or sessions. A specific application program, device or other resources can be used to achieve the session. One example is the use of off-the-shelf software such as Microsoft's "NetMeeting" to place the customer and agent into an interactive shared-view session over the Internet. Any of the communication types discussed herein can be a conduit for the session.

At step 405, the Plaid script to control the session is selected and launched. The use of a scripting language (described in detail, below) to control the sessions provides customizability for each different call center, and provides the ability to change the session characteristics, if desired. Next, step 407 is executed to create a communications channel in the CIU. As mentioned above, the appropriate communication channel is allocated in accordance with the communication type of the session.

At step 406 the WebACD waits for customer entry, if necessary. This is the case where a customer selects, for example, a voice-over-IP session and must start the session by launching software at the customer's end, configuring a device such as a microphone, etc. Provision is made where the customer does not initiate the session within a predetermined period of time and the task times out. A timeout results in exiting the flowchart at B.

Assuming that the customer initiates the session within the timeout period, step 408 is next performed to run scripted control instructions to handle the rest of the session. The preferred embodiment uses a proprietary script language, "Plaid," which is detailed further below. If an agent has not been assigned to the call at this point the script, at step 410, directs the task to wait for an agent assignment. As mentioned, an agent can self-assign to a session. Or agents can be automatically assigned as detailed in the next section of this specification. Agents can also be assigned by an agent supervisor, or by other appropriate means. The present invention allows much flexibility in the assignment of agents to calls. Much of the agent-assignment aspect of the system is configurable within the call center so that different call center operations can choose the most suitable way of assignment. For example, one option is that after a time period if no agent has self-assigned, or been otherwise assigned, the task is instructed to check other groups or pools of agents. Some call centers may divide agents into groups based on the types of questions being handled, communication type being used for the session, experience or expertise of agents, etc.

Once an agent has been assigned to the call, step 412 is performed to wait for the agent to actually join the session. Again, depending on the communication type of the session there may be a software or hardware startup delay, or other overhead in connecting to the session. If the task times out at step 412 the task can be entered back into step 410 where it is "asleep" waiting for an agent assignment. This means that the task is basically inactive until a process interrupts ("wakes") the task because a condition, such as agent assignment, becomes true.

Other events may wake the task at either of steps 410 or 412. These can be customer cancellation or disconnection. A customer cancellation occurs when it is known that the customer wished to cancel the session. This can occur when the customer clicks on a "disconnect" button, or makes some other positive indication of terminating the session. A disconnection is an involuntary interruption with the session and it is assumed that the customer wishes to continue the session. In the cancellation case, the flowchart exits at B. In the disconnection case, a WebCenter Text-Conferencing interface informs any assigned agent of the disconnect at step 414. The agent can then wait for customer re-entry as indicated by step 416. Assuming the customer returns, step 418 places the session back to the state prior to the disconnection. If the customer does not return within a timeout period, the flowchart exits at B.

Assuming, at step 412, that an agent has been assigned and enters the session, the flowchart proceeds to A.

FIG. 4B shows a second portion of the flowchart of FIG. 4A.

In FIG. 4B, the flowchart picks up from FIG. 4A at point A, where an agent has entered the session. Step 420 represents the agent-customer interaction. Typically this is a chat session or voice-over-IP session that is terminated when either the agent or customer disconnects.

The case where an agent disconnects abnormally is handled by steps 430, 432 and 434 in much the same way that customer disconnect is handled by steps 414, 416 and 418. At step 430 the customer is notified that the agent has disconnected (i.e., connection was involuntarily lost). At step 432 the task allows the customer to await agent return and reconnection to the session. If the agent does not return within a timeout period the flowchart exits via steps 416 and 418. If the agent does return then step 434 ensures that the task resumes the session at 420.

The case where the customer becomes absent results in step 422 being executed where a timeout is set for a wrap condition. If the customer fails to reconnect then a wrap timeout is executed and the flowchart exits. The disconnect of the customer can also be handled by steps 414, 416 and 418 of FIG. 4A. If the agent fails to wrap within the timeout period the task is canceled, or "killed." The act of an agent wrapping the session at 420 or 422 leads to step 424 where termination is next expected. As discussed in more detail below, the agent "wraps" by clicking on a button on the agent interface. The system then assumes the agent is going through wrap-up bookkeeping, paperwork, etc. This allows the system to keep accurate track of time spent in actual sessions. The system can also begin its own internal wrap processing, as needed. After performing wrap-up bookkeeping the agent signifies termination.

After termination, step 416 is executed to destroy the task used to maintain the session at step 428 the software task completes and the flowchart is exited.

3.B Assigns Agents to Calls

The WebCenter allows a single agent to handle more than one call at a time. Each agent is allocated, or assigned, a number "endpoints." An endpoint can be thought of as a communication line over which information can be exchanged with a single customer. The ability to allocate multiple endpoints to a single agent helps maximize agent effectiveness.

The process of assigning an agent to a call is executed after WRU escalation process determines that a customer's call should be assigned to an agent. Although there are many possible ways to determine whether and how agents, and agent endpoints, are assigned, the present invention operates using the following criteria.

Central to the assignment of calls to endpoints is the notion of a "state" for each endpoint. In the preferred embodiment, each endpoint can be in one of four states. These states are as follows: (1) available=the endpoint is not being used and can be assigned to a call; (2) idle=the endpoint is not being used but cannot be assigned to a call; (3) talk=the endpoint is presently assigned to a call and cannot be assigned to another call; and (4) wrap=the endpoint if finished with a call but bookeeping and reporting with respect to this endpoint is being performed so the endpoint cannot yet be assigned to another call.

Naturally, schemes for assigning calls to endpoints, or agents, can vary widely. For example, another scheme can delete one or more of the states above such as the "wrap" state. Another scheme can use additional states such as a "suspended" state where the call has been placed on "hold."

Using the four states above, a basic formula for assigning agents is to assign the next call to the least-busy agent according to the ratio $$\frac{\text{\# assignable } endpoints}{\text{\# agent allocated } endpoints}$$

which is computed for each agent.

Thus, the larger the ratio, the less busy is the agent. For example, assuming agent1 has 4 endpoints allocated and is presently handling 1 call. This means that agent1 has 3 assignable endpoints left out of the total of 4 allocated endpoints. Therefore, agent1 has a ratio of 3/4. This is in contrast to the situation where agent1 is not handling any calls and would have a ratio of 4/4. Thus, agents with higher ratios are more available to handle calls and calls are assigned to the agent with the currently highest ratio. Agents with a ratio of 0 cannot handle additional calls at the moment. In cases where there is a tie in the ratio (and the ratio is not 0), the calls are assigned to the least-recently assigned agent. Another possibility is to assign the call on a round-robin basis. Other methods of assignment are possible.

Assume agent2 has 3 endpoints allocated and is handling only one call. Thus, agent2's ratio is 2/3. Since this is less than agent1's 3/4 ratio, agent1 would get the call. The rationale is that agents with a higher number of allocated endpoints are more adept at handling more calls. Thus, it makes sense to assign the next call to agent1.

Allocation of endpoints can be made by agent supervisors. Additionally, the preferred embodiment allows each agent to have some control over their endpoint allocation. By using buttons on the agent user interface as described below, each agent can increase or decrease their endpoint allocation dynamically.

A refinement to the call allocation approach is to take into consideration the communication type. That is, calls that are coming in on a chat channel can be ratioed separately from calls coming in from IP voice channels. In other words, if agent 1 has two chat channel endpoints and two IP voice channel endpoints and if agent1 is presently handling a chat channel call then agent 1 has a 1/2 ratio for chat channel call assignment and a 2/2 ratio for IP voice channel assignment.

Another refinement is to take into account the efficiency of an agent with respect to different communication types. For example, if agent 1 is more efficient at handling chat channel calls then agent1 can be allocated 3 chat channels and only 1 IP (or any other) channel. Many such variations are possible. All variations stem from the approach of the present invention in providing several different communication type channels integrated in a single ACD system, i.e., the WebCenter, while maintaining the ability to separately allocate, assign, respond to, log and analyze exchanges of information based on communication types.

Another refinement is to assign calls based on customer ranking. For example, a customer ranking according to level of service (e.g. whether the customer is a "gold," "platinum," overly-repetitive, etc. customer) can be implemented to assign a number to customers that allows a customer to be moved up in a queue, to be assigned to a different queue, or to other wise gain priority over other customer calls. For example, customers who have emergency situation can be passed through to an agent regardless of their position in a queue. Or even regardless of the availability of agents according to the normal approach using the ratios above.

3.C Agent User Interface

FIGS. 3A-C illustrate screen displays of the agent graphical user interface (GUI) of the preferred embodiment.

FIG. 3A shows agent client main screen 400 as it appears on an agent's computer system display. Screen 400 includes a standard set of pull-down menus at 502, a row of buttons at 504 windows area 508, additional buttons at row 506 and indicators at row 510.

Row of buttons 504 includes (from left to right) separate buttons for agent login/logout, opening an endpoint, closing all endpoints, creating a new resource, viewing the WebCenter home page, requesting a display of customer data and opening a NetMeeting® session (note: NetMeeting® is a facility provided by software manufactured by Microsoft Corp.). The "agent login/logout" button is pushed by the agent prior to performing work and after the agent's shift has complete. This button notifies the system that the agent is online and is used to start and stop timing and recordkeeping with respect to a particular agent. The "open endpoint" button is pressed by an agent when that agent wants to increase the number of endpoints assigned to that particular agent.

The "close endpoints" button reduces the endpoint limit to zero for a particular agent. It is used by an agent when the agent does not want any new calls. However, any calls that are already open, or in session, remain active. The use of the "close endpoints" button allows the agent to stop any new incoming calls from being assigned to the agent. The "create new resource" button causes a new, untitled, resource to appear in the Resources window, discussed below. The "Web Center Home page" button displays the call center's home page in the agent's browser window. The home page typically includes statistics, information links, utilities, etc., particular to the specific installation that is hosting the call center. The "customer data" button brings up records, statistics and other data for a current customer. The "NetMeeting" button initiates a NetMeeting session that allows the customer and the agent to share screens, pointers and further facilitates communication between the customer and agent. For a description of NetMeeting session characteristics see, e.g., http://www.microsoft.com/netmeeting/sdk/.

Window 530 endpoints that are currently active, or in use. Each active endpoint is identified with an icon, such as endpoint icon 540, and with the associated customer's name, if available, or with other identifying information. The preferred embodiment uses color coding to indicate how long a customer has been waiting for a response from the agent. In the preferred embodiment, the endpoint icon is green when the customer is not waiting for a response from the agent. This is the case where the agent has just typed a reply to the customer. After a customer completes a response then the customer's endpoint icon becomes yellow. If the agent does not response to the customer by typing a reply within a predetermined amount of time then the customer's icon becomes red. Thus, the color scheme serves as an effective visual cue to alert an agent to a customer who has been waiting too long for a response. Such a visual cue is not intrusive and allows the agent to continue to handle other customers' calls and to ignore the cue, if necessary.

FIG. 3B shows a flowchart depicting the color cue transitions for endpoint icons described above. Naturally, other types of cues are possible. For example, the endpoint icon can flash or otherwise animate. The cue does not have to be limited to the icon but can include the customer's name and other information the same line as the icon. A completely separate visual indicator can be used. Audio indicators can also be used. For example, a tone that increases in intensity, an intermittent beep whose repetition rate is increased., speech-synthesis, etc., can be used.

Returning to FIG. 3A "Initial question" window 438 displays the initial question for the current customer. The current customer is the customer that is highlighted in the endpoint window. In the example shown in FIG. 3A, the current customer is "Bill." The current customer can by selected by the agent. The agent can click on a customer's name, use the tab key, or use another control to select among the active endpoints. As the current customer changes, that customer's initial question I displayed in window 438.

Communication window 532 shows the dialogue between the customer and agent. Agent and customer responses are displayed in this window. The window scrolls up, as needed, similar to a word processing window.

Resource window 534 allows an agent to send pre-defined resources such as a Uniform Resource Locator address or ready-made text to the customer. The agent merely double-clicks on a resource icon to send the associated resource. Alternately, the interface can provide for "drag and drop" of the resources into communication window 532. The "Send URL" and "Say" buttons can also be used to conveniently transfer information to the customer. The "Say" button is used to display a selected resource, or text, as text on a customer's screen. The "Send URL" button causes the text to be interpreted as a URL and replaces the customer's web content frame with the web page defined at the URL. These buttons are useful where, for example, a URL is desired to be merely sent as informative test, or where a URL embedded in text is desired to be used to direct customer's display to a specific web page.

The pre-defined resources are useful where the agent has certain Internet web pages that are often referred to a customer, or where the agent frequently needs to provide the same text information to customers. In FIG. 3A, each resource includes a name. Acuity URL at 442, FAQ text at 444 and Yahoo™ URL at 446 are shown. The resources can be organized into one or more folders.

Resource creation window 536 is activated by the "crate new resources" button discussed above. When the button is pressed, window 536 becomes the active window and allows the agent to type text or a URL and to save the text or URL as a resource in resource window 534.

The indicators at 510 include the server name at 550, agent's name at 552 and total endpoints available for this agent at 556. FIG. 3C more clearly shows all of the indicators at the right of the display as agent's name 582, supervisor name at 584, supervisor group at 586 and number of available endpoints at 588.

FIG. 3C shows the "pager" display of the agent interface. This display allows agents to send messages to each other and to receive messages from other agents. It is similar to an email interface in that sent or received messages, or pages, can be displayed in main window 560. Sent or received message display can is selected by pull-down menu 562. An address book or page (shown) display is selectable at 564. Additional buttons on the pager display include button 566 to bring up an offline task list, button 568 to display data wake information, button 570 to display customer records, button 572 to start a NetMeeting™ session, button 574 to enable invisible mode (for supervisors only), button 576 to create a new page, button 578 to set agent information and button 580 which creates a "minichat" window for conversations with other Agents. "Invisible mode" applies only to Agent Supervisors. All functions work identically, except that the participants in the room don't see any indication that the supervisor is entering or leaving the room.

FIG. 3D shows the address book display accessed from the control at 564 of FIG. 3C.

4. Data Logging

A. Introduction

Reporting is vital to the operation of an efficient call center. Through real-time reporting the call center manager can determine how well customers are being serviced, how well agents are performing, and how well the system in general is operating as it happens. This kind of information is very useful to perform ad-hoc staff changes, identify and assist agents who are having difficulties, and recognize failed hardware or software. Historical reports help the call center manager look at all of those factors in the past, where the information can be more carefully analyzed to produce a more efficient call center in the future.

Acuity's WebACD has been specifically designed to provide very detailed reporting information on a real-time and historical basis to the call center manager. This document describes the kind of data this collected, the rationale behind the data, and how it can be used to make the WebCenter more efficient. Examples of reports are shown in FIGS. 5A-I.

B. Background

For further discussions, it is necessary to understand the terms used in WebACD reporting. These terms have very specific means in the context of the WebACD so the call center manager can know exactly what each value means as he seems it.

B.I. Basic Terms

The following terms listed in Table I form the foundation for WebACD statistics computations.

TABLE I

| | |
|---|---|
| agent | An agent is an employee of the call center who communicates with customers. |
| customer | Customers are individuals who escalate to the WebACD from the Internet. This is the person contacting the agent. |
| team | A team is a collection of agents who have similar abilities. An agent must be in one, and only one, team. typically tasks are queued for teams and the first agent to become available in the team will receive the task. |
| task | When a customer connects to the WebACD, he creates a task. In a telephony call center, this would be a "call," but since we handle many different media types, Acuity uses the term "task." |
| task type | When the customer escalates to the WebACD, a task type is specified. Typically this is encoded in the live help button. For example, if the customer asks for live help on a product information page, the task type might be "Sales." If he asked for help while looking at a list of known defects, the task type might be "Support." In a traditional call center, this is called a "call type" or "application." Statistics are collected against the task type so the call center manager can look at how customers who asked for Sales and customers who asked for Support are being serviced. |
| task id | Each task in the system is assigned a unique number called a "task id." This number is two parts, separated by a dash. A sample task id is 5-23. In this example, 5 is called the session number. Each time the WebACD is restarted, the session number is incremented by one. The second part, 23, is the task number for that session. The task number starts over at 1 when the session number is incremented. |
| original task id | When a customer escalates, his task is assigned a unique task id and the original task id for his task is set to be the same as the task id. If, during a conversation with an agent, the task is transferred to another agent, the act of transferring generates a new task which has a new task id, but the same original task id as its parent. This allows reports to treat transferred tasks individually or grouped into customer sessions. (Transfer is not available in WebCenter Express, so in that product, the original task id is always equal to the task id.) |
| completed task | A "completed" task is one in which the agent and customer have finished working on the task and the customer talked to an agent. Compare this to an abandoned task. |
| abandoned task | A task is abandoned if a customer ended the session before speaking with an agent. In a traditional call center, this is equivalent to the customer hanging up the telephone while waiting in the queue. |
| endpoint | Agents in WebCenter can handle more than one task at a time. Each task is delivered to an "endpoint" on the agent client. Think of an endpoint as a telephone on the agent's desk. If the agent has two endpoints, then he can receive two calls at the same time. Likewise, if an agent has two endpoints, he can receive two tasks at the same time. |
| route time | Technically, route time is the length of time between when the customer presses the live help button and the customer is placed in a queue. Practically this measures the amount of time it took the customer to down load the customer client. |
| queue time | Queue time is the amount of time that a customer spent waiting for an agent to arrive and help. |
| talk time | Talk time measures the length of time that a customer and agent were in conversation. |
| wrap time | After an agent finishes the conversation, he "wraps" the task. In a traditional ACD, this is equivalent to hanging up the telephone. Once the conversation has completed, the agent may have to do some post-call work such as fill out paper work from the conversation that just ended. Wrap time is the amount of time the agent spent in that state. |
| handle time | Handle time is the sum of talk time and wrap time. It represents the amount of time an agent spent handling a task. |
| service level threshold | Service level threshold is a queue time goal for a particular task type. This value will be used for computing service level. |
| sign on time | Sign on time is the amount of time the agent has spent signed on to the WebACD. |
| idle time | Idle time is the amount of time the agent spent in the idle state. An agent is in the idle state if he has no available endpoints and is not working on any tasks. |
| available time | Available time is the amount of time each endpoint of agent is available. Since this value is based on endpoints rather than the whole agent, it is "double counted" for one agent. In other words, if an agent has two endpoints that are available for an entire ten minute period, then his available time will be 20 minutes. For this reason, available time is never reported directly in WebCenter, it is only used in other calculations. |
| talk time (for an agent) | Talk time for an agent, like available time, is double counted because an agent can be talking to more than one customer at a time. Like available time, talk time is never reported directly for this reason. |
| wrap time (for an agent) | Since an agent can be wrapping more than one task at a time, it is double counted just like available time and talk time. Therefore wrap time for agents is never reported directly. |

B.2 Computed Values

From the raw data that the WebACD collects a number of useful values can be calculated. This section describes how those calculations are done in standard WebACD real-time and historical reports. If these calculations do not meet the needs of a call center manager, the raw data used for the calculations is also available so different computations can be done.

B.2.i Completed Statistics

Completed statistics are values computed after a task has completed. For a traditional ACD, this is how most, if not all statistics are calculated. The next section will describe ongoing statistics and how they differ from completed statistics.

The definitions provided here are generic, so it is assumed that all statistics are calculated over some group of tasks. For example, we might be computing average handle time for the tasks that particular agent handled or for all the tasks of a given task type.

Average route time—Average route time for a given group of tasks is the average route time for those tasks. It is computed by (sum of route time for all completed tasks)/(number of completed tasks). Note that this value only computes route time for completed tasks, not abandoned tasks. This value is a good measure of connection speeds for customers. Over a 28.8 modem the route time will be between 30 and 60 seconds. For a local Ethernet connection, the route time will usually 2 seconds or less.

Average queue time—Average queue time is computed by (sum of queue time for all completed tasks)/(number of completed tasks). Note that this value does not included abandoned tasks, so if a customer abandoned, his queue rime is not counted toward this statistic; it is counted toward average wait before abandon. This value measures how long customers are waiting to speak to an agent. Queue time is very important factor in managing customer satisfaction with a call center.

Average talk time—Average talk time is computed by (sum of talk time for all completed tasks)/(number of computed tasks). This value is usually used to measure the efficiency of agents because it measures the amount of time an agent spent talking with a customer. For example, in a technical support context, this can measure how quickly agents are able to answer customer questions. In a sales context, it might measure how long the agent is able to keep the customer engaged. Note that this value is computed :tram the agent perspective, not the customer perspective. In a transfer situation, if AgentA transfers to AgentB, but continues to chat, even after AgentB arrives, then talk time will be accumulating for AgentA as well as AgentB. This statistic measures the amount of time AgentA and AgentB spent talking to the customer, but not how long the customer spent talking to any agent.

Average wrap time—Average wrap time is computed by (sum of wrap time for all completed tasks)/(number of completed tasks). This is a good measure of the amount of time agents spend in post-call work. In a transfer scenario, each agent has his own wrap time.

Average handle time—Average handle time is computed by ((sum of talk time for all tasks)+(sum of wrap rime for all tasks))/(number of completed tasks). This value is a good measure for how long agents are spending on average to handle tasks. As described under average talk time, this measure is from the agent, not the customer perspective.

Service level—Service level is the percentage of task that were answered by an agent before the service level threshold. This value is computed by (number of tasks with queue time less than the service level threshold)*100/((number of completed tasks). Service level is a good way to tell whether or not a call center is answering tasks efficiently. Unlike average queue time, it will not be skewed by very large or very small queue rimes because it says "this percentage of tasks were answered within x seconds."

Abandon rate—Abandon rate is the percentage of customers who abandoned before speaking with an agent. It is computed by (number of abandoned tasks)*100/((number of completed tasks)+(number of abandoned task)). High abandon rates can signal unhappy customers because they get tired of waiting and exit.

Longest wait before abandon—Longest wait before abandon is a measure of the amount of time that the most patient customer was willing to wait before abandoning the task. This value is computed by looking at all the abandoned tasks and finding the one with the largest route+queue time. It can be used to manage queue times because it tells how long the most patient customer was willing to wait.

Average wait before abandon—Average wait before abandon is the average amount of time a customer was willing to wait before abandoning the task. This value is computed by ((sum of route time for all abandoned tasks)+(sum of queue time for all abandoned task))/(number of abandoned tasks). Since this value tells the average amount of time a customer was willing to wait before abandon, this value can be used in conjunction with longest wait before abandon to manage queue time.

B.2.ii Ongoing Statistics

While completed statistics are used to find averages about tasks, ongoing statistics are used to compute agent utilization and averages of concurrent items. For example with ongoing statistics, you can compute the percentage of time an agent spent in talk as well as the average number of calls in queue. To understand how this can be done, it is important to first understand how ongoing statistics are gathered.

Ongoing statistics differ from completed statistics mthe time at which the time is counted. Statistics in the WebACD are collected in one minute "buckets." Let's say a task was in route from 5:00 to 5:01, queue from 5:01 to 5:03, talk from 5:03 to 5:09 and wrap from 5:09 to 5:09:45. When computing completed route, queue, talk, and wrap times, the values will all be added to the 5:09 bucket and the number of tasks completed will be incremented by one in the 5:09 bucket. If this is done for several tasks, then the average queue time can be calculated by dividing the queue time accumulated in the 5:09 bucket by the number of tasks completed in the 5:09 bucket.

Ongoing statistics are not counted at the end of the task. Instead they are calculated as they happen. In the case out lined above. the 5:00 bucket would have 60 seconds of route time the 5:01 and 5:02 buckets would each have 60 seconds of queue time, each of the buckets 5:03 through 5:08 would have 60 seconds of talk time, and 5:09 would have 45 seconds of wrap time. Note that calculating average queue time with these values is not possible. If there were several tasks, then it is unclear what the queue rime was for anyone task, just that from 5:05 to 5:06 there was one task mqueue. Note that if there were two tasks in queue from 5:05 to 5:06, then the 5:05 bucket would have 120 seconds of queue time. Note that if we divide 120 (the queue summed in the 5:05 bucket) by 60 (the length of the bucket), that we get 2, which was the number of tasks mqueue. Likewise, there were two tasks, each in queue for 30 seconds, the bucket would sum to 60 seconds and the division from above would yield 1, which was the average number of tasks in queue. In general given an ongoing statistic, if we take the sum over an interval of time and divide by the length of the interval, we can compute the average number of tasks that contributed to the sum.

Using ongoing statistics, we can compute the following values.

Average number of tasks in queue—Given a period of time, the average number of tasks in queue is the average number of tasks that were in the queue over that period of time. This can be computed using the formula (sum of queue time for all tasks that should be included in the average)/(period length). This value allows the call center manager to look at queue length trends. In a historical report, this value is useful because it provides queue length, which is normally an instantaneous value, over a period of time. During real-time reporting, this value is more stable than straight queue length, which can fluctuate a great deal up and down based on how tasks arrive and how agents handle tasks.

Average number of signed on agents—Given a period of time, the average number of signed on agents is the average number of agents who were signed on during that period. This can be computed by the formula (sum of ongoing sign on time for all agents which should be included in the average)/(period length). This value can be used to compute the number of agents who are working over some period of time, given that the agents may come and go often. For example, if the call center has two agents and they both work 30 minutes, take a 10 minute break, work another 30 minutes, take another 10 minute break, and so on, then this calculation could show you that you are paying for 2 full-time agents, but combined they are only acting as 1.5 full-time agents.

Average number of endpoints—The default WebCenter agent client allows agents to choose how many endpoints they have, and thus how many concurrent tasks they can handle. Given a pool of agents and a period of time, the average number of endpoints is the average number of endpoints that those agents had available during that period of time. To compute this value, the WebACD uses the quotient (ongoing available time for the agents+ongoing talk time for the agents+ongoing wrap time for the agents)/(period length). From the definitions in section 0, available, talk, and wrap times are all double counted. This formula shows why that was done. By double counting, we can compute the average number of endpoints that an agent is working on. This value is useful because it will show how many concurrent tasks agents have allowed themselves to answer.

Percent idle time—Percent idle time is the percentage of sign on time that the agent spends in the idle state. This is computed by (sum of ongoing idle time for agents)*100/(sum of ongoing sign on time for agents). Remember that these are ongoing statistics, so if, over a ten minute period, the agent is signed on for all ten minutes and idle for two of those minutes, then his percent idle time would be 20%. In the idle state, the agent is taking a break. He is still signed on, but he cannot receive additional tasks and he is not currently working on any tasks. For companies that like to use sign on lime as a kind of time clock, idle time provides a way for the agent to take a break while still "on the clock." This value is useful because it tells what percentage of time an agent spent in the idle state.

Percent available time—Percent available time is the percentage of an agent's working capacity that he spends available. This value is impacted by the number of endpoints that an agent has selected for himself, but not the maximum number of endpoints that an administrator has assigned to him. It is computed via the formula [(ongoing sign on time for the agents−ongoing idle time for the agents)/(ongoing sign on time for the agents)] 100* [(ongoing available time for the agents)/(ongoing available time for the agents+ongoing talk time for the agents+ongoing wrap time for the agents)]. The second half of the formula, in square brackets, computes the percentage of working time the agent spent available, where working time is (available time+talk time+wrap time). To illustrate, imagine over a ten minute period an agent had two endpoints available the whole time and a third one in talk the whole time. In this case, ⅔ or 67% of the agent's working time was spent available. This says that only 33% of the agent's working capacity is being utilized. The first have of the formula is used to normalize the percentage with idle time. Since idle time is not double counted, this provides a way to show what percentage of an agent's total capacity is spent available, not just the percentage of his idle capacity. This value is useful for identifying under utilized agents. If a large percentage of the agent's capacity is available, then the agent is under utilized. When comparing percent available time between agents, it is very important to also compare their average number of endpoints. An agent with an average number of endpoints of 1.0 and a percent available time of 50% is spending 50% of his time sitting, waiting for a task to arrive. If another agent has an average number of endpoints of 2.0 and also a percent available time of 50%, then on average he is always working on one task.

Percent talk time—Percent talk time is very similar to percent available time; it measures the percentage of an agent's capacity that is spent talking to customers. This value is computed using the formula [(ongoing sign on time for the agents−ongoing idle time for the agents)/(ongoing sign on time for the agents)] 100* [(ongoing talk time for the agents)/(ongoing available time for the agents+ongoing talk time for the agents+ongoing wrap time for the agents)]. Like percent available time, when comparing the percent talk time performance of two agents, it is important to also compare the average number of endpoints for that agent.

Percent wrap time—Percent wrap time is very similar to percent available time; it measures the percentage of an agent's capacity that is spent in post-call work. This value is computed using the formula [(ongoing sign on time for the agents−ongoing idle time for the agents)/(ongoing sign on time for the agents)] 100* [(ongoing wrap time for the agents)/(ongoing available time for the agents+ongoing talk time for the agents+ongoing wrap time for the agents)]. Like percent available time and percent talk time, when comparing the percent wrap time performance of two agents, it is important to also compare the average number of endpoints.

Average number of tasks being handled—Because agents can handle more than one task, it is important to compute the average number tasks that the agent handles concurrently. Given a period of time and a pool of agents, this value can be computed by (ongoing talk time for the agents+ongoing wrap time for the agents)/(length of the period). Especially early in deployment this value should be monitored because it tells the call center manager how many tasks an agent can handle at the same time.

B.3. Report Naming Conventions

To make it easier for the call center manager to understand exactly which report he needs. Acuity has devised a set of naming conventions for reports. The rules are as follows: If the report requires a parameter, then use "For<ParameterName>X". For example, TasksForAgentX iterates over all tasks handled by an agent whose name is specified by the report generator.

If the report contains nested iterations, the top level iteration is .first. then "By," followed by the inner iteration. For example. TeamPerfonnanceByAgent iterates over all teams, but iterates over all agents within a team before moving on to the next team.

If the report iterates only once, then use "For" and the quantity iterated over. For example ActivityForAllTaskTypes simply reports on the activity seen in each task type. Another example is TasksForTaskTypeX, which lists all the tasks for the specified task type If the report is for a specific date, then use "OnDayX". For example, TaskTypeXActivityOnDayY reports the activity for one task type on one particular day, where the task type and the day are specified by the person generating the report.

C. Standard Reports

As part of Web Center Enterprise and WebCenter Express, there are a number of standard reports that provide a foundation of reports on which companies can build reports customized for their business processes.

Enterprise Reports—All WebCenter Enterprise reports are written in Crystal Reports, the industry standard reporting package. Using Crystal, customers can generate paper or web based reports. The following sections describe the reports which are shipped with WebCenter Enterprise and how they should be interpreted.

DailyActivityForWebACD—Given a range of days, this report gives a summary of activity that happened on each day for the entire WebACD. Since the calculations are for the entire WebACD, all agents and all task types are included in the summaries. This report is useful for getting an overall summary of the system behavior. For more detail, look to the WebACDActivityOnDayX and task type and agent reports.

WebACDActivityOnDay X—Given a date, this report lists activity during different types of one day. The length of the time interval used in the report is configurable and can be as short as one minute or as long as one hour. The columns Start and Stop specify the time interval that the row covers. If an interval is missing, then all the values for that row would have been zero.

Remember from section B.2.i that the fields Completed, Abandoned, Service Level, Queue Time (avg), and Handle Time (avg) are computed as tasks complete. This means that for a task to be included in these calculations, it must terminate during the specified time interval.

DailyActivityForTaskTypeX—Like DailyActivityForWebACD, DailyActivityForTaskTypeX takes a date range and a task type and then reports the performance of that task type for each day in the date range. This report is useful for comparing the performance of one task type over all the days in a week or month. For example, this report may show that after a large promotion, the number of tasks to the Sales task type increased, or that the day before a holiday agents do not service tasks as quickly as they do on other days.

TaskTypeXActivityOnDayY—Like WebACDActivityOnDayX, TaskTypeXActivityOnDayY reports performance for different times during one day, only this report is for one particular task type. The length of the intervals is configurable in the WebACD administration pages, so the WebCenter manager can change the interval to suit their needs based on how much detail he would like in his reports. This report is useful for looking at the performance of a single task type throughout the day. For example, this report may tell the WebCenter manager when he should schedule agents for lunch, based on typical call volumes.

Remember from section B.2.i that the fields Number Completed, Number Abandoned, and several others are computed as tasks complete, and from section B.2.ii that Tasks in Queue (avg) and Tasks Being Handled (avg) are calculated on an ongoing basis. As a result, the completed statistics may lag the ongoing statistics. For example, one period may have a large number of tasks in queue, which would translate to a large number of completed (or abandoned) tasks in the next period.

ActivityForAllTaskTypes—Given a date range, this report summaries the activity during that date range for each task type. This report is useful for comparing the performance of different task types. For example, it allows the WebCenter manager to verify that the queue time for sales tasks is lower than the queue time for support tasks. For most Web Centers, this will be the most basic overall report.

TasksForTaskTypeX—This report lists all of the tasks that arrived for the specified task type during a range of dates. If other reports give information that looks anomalous, this report can tell exactly which tasks were used to generate the reports.

Remember that if a task is transferred, it receives new Task ID, but keeps the same Original Task ID. This report shows how tasks were transferred be grouping tasks by their Original Task ID. Grouping the tasks in this way lets the WebCenter manager quickly see all of the agents that handled a particular customer. A transferred task can be abandoned if the agent cancelled the transfer before the second agent arrived or if the customer abandons the task all together while waiting for the second agent to arrive.

TeamPerformanceByTaskType—TeamPerformanceByTaskType is the most basic team performance report. Through Plaid the WebCenter administrator can make multiple task types queue for multiple teams. This report allows the WebCenter manager to watch how each team in the WebACD performs against each task type they serve.

Note that several of the columns on the left are reported just for the entire team, not for individual task types. This is because those statistics cannot be divided into task types. For example, an agent is signed on, but signed on for a particular task types, so reporting signon time against different task types does not make sense.

TeamPerformanceByAgent—TearnPerformanceByAgent allows the WebCenter manager to look at the performance of individual agents during the specified range. The agents are grouped by team so agents handling similar types of tasks will be grouped together and can be compared.

Remember from section B.2.ii that when comparing the percent available, talk, and wrap, for agents that it is important to also consider the average number of endpoints for each agent.

TasksForAgentX—Much like the report, TasksForTaskTypeX, this report allows the WebCenter manager to look at all of tasks that were used to compute other statistics. However, this report does not show abandoned tasks or how a task was transferred. For that information, see the TasksForTaskTypeX report.

Note that even though this report specifies the queue time for each task the agent handled, this value should not be used as a performance metric of the agent. The queue time for the task is a function of how the routing has been implemented in the routing scripts and how quickly the teams assigned tasks are servicing them. However, this value does allow the Web Center manager to see how long customers are waiting before they talk to this agent. If customers are continually dissatisfied by an agent and the customers who get to that agent have been waiting a long time, it may be that the customers were quite upset before even arriving at the agent.

5. Plaid Scripting Language

Plaid is the scripting language used by Acuity's WebACD to customize how tasks are routed as they arrive off of the web site. The name Plaid is a word, not an acronym. This document explains what one should consider when building Plaid scripts as well as the syntax of the language.

Information to Gather

This section describes the information that one should gather before attempting to create Plaid scripts. Collecting this information, which defines the business requirements for Plaid, is important before writing scripts so the purpose and requirements of the scripts are well-defined before starting.

Define Task Types

The first step in creating scripts is to define the task types that will be used. Task types represent the different ways for a customer to enter the WebCenter. For example, there might be one task type called Sales and another called Support for customers with product information and technical support needs, respectively. Each task type can have its own script that executes. Furthermore, statistics are collected per task type so the WebCenter manager can look at the performance of the WebCenter on a task type by task type basis. The following sections describe some considerations when creating task types.

Maintenance

More broadly defined task types may be easier to maintain. The broader the task types are, the fewer entry points customers have to the WebACD and probably the few the scripts that need to be written and maintained. Likewise, broader task types often imply larger teams of agents, so it may be easier to maintain agents in larger, rather than smaller teams.

Statistics

Broadly defined task types create more stable statistics and narrowly defined task types create more specific statistics. A large number of the statistics collected in a WebCenter are averages. The larger the pool of tasks for that average, the more "stable" the statistics will be from one day to the next. For example, if a task type is so narrow that it only has a few tasks a day that arrive, then one long task could skew the statistics for a task type that whole day. On the other hand, if the task types are too broad, then the statistics collected are not precise enough to provide meaningful information. For example, WebCenters often have different wait type requirements for customers requesting sales versus customers requesting technical support. If those two task types were grouped together, then the wait time statistics generated for that task type would not allow the WebCenter manager to decide whether the wait times for each group was satisfied.

Customer Interface

There are basically three different ways that customers can select a task type. Topic through the WRU. In the WRU, there is a concept of a topic. Questions answer pairs are grouped by topic so customers can browser through the questions and answers, looking for the information they need. When creating a topic in the WRU, the administrator is also asked to specify a task type for the WebACD so when a customer escalates from a certain topic, the WebACD knows which task type to use. Many topics can go to one task type, but there must be at least one topic per task type. Typically a customer must select a topic when asking a questions, so if there are a very large number of topics, the customer may be confused as to which one to select.

Selection of task type from drop down. When the customer asks a question, he can pick a task type from a list that is populated from the WebACD. Again, if there are too many task types or their names are not meaningful to a customer, then the customer may be confused as to which task type to select.

Pressing a LiveHelp button. If all the customer does is press a LiveHelp button, the task type can be implied based on where he came from in the web site. In that case, it is important to recognize that the web site must be maintained with the appropriate task types.

Historical Comparisons

Task types should not change very often so the Web Center manager can do historical comparisons of different task types. For example, the WebCenter manager may want to look at the number of tasks that came in for the task type CorporateSales over the last year. If halfway through the year CorporateSales was combined with FieldSales to from the task type Sales, the WebCenter manager is not going to be able to go back over the year and look at the performance of CorporateSales.

Define Teams

Once the task types have been defined, the teams that agents should belong to need to be created. In a preferred embodiment, an agent can only be in one team. Teams were designed this way for reporting. Certain statistics, including available time and idle time can only be accounted toward an agent's team if the agent is only in one team. Then when it comes to routing tasks, the script can place the task in queue for multiple teams. Other embodiments would assign an agent to multiple teams, and be assigned on a first-come first-served basis.

Routing Specificity

This section describes some of the areas that should be considered when creating teams.

The smaller the teams are, the more specific the routing of tasks can be. For example, there could be one team called TechSupport or two teams, MonitorSupport and PrinterSupport. The latter scheme would allow routing to agents who are more likely to be able to answer the customer's question. Task types largely define how specific the teams should be because if there are not separate task types for monitor support and printer support, then it is impossible to distinguish those types of tasks in the WebACD, and thus route to different teams.

Queuing Efficiency

The larger the group of agents that a task queues for, the more efficiently the task will be answered. This is because in a small team, customers who talk to one agent for a very long period of time can keep that agent from talking to other customers, thus holding up the queue. If the task is queued for a large group of agents, this problem is alleviated because other agents can handle tasks as the one customer spends a lot of time with an agent. The WebACD allows the customer to queue for more than one team, so small team size just means that the script would have to list several teams.

Maintenance

Larger teams may be easier to maintain. If teams are very small, then the scripts that send tasks to those teams must be kept up to date as teams are created and destroyed.

Statistics

Larger teams create more stable statistics and smaller teams create more specific statistics. A large number of the statistics collected in a WebCenter are averages. The larger the pool of agents for that average, the more "stable" the statistics will be from one day to the next. For example, one agent has a very bad day and is idle for nearly the whole day, then that one agent could skew the statistics for the whole team. In larger teams, the effect of that one agent would be smaller.

Historical Comparisons

If the Web Center manager is interesting in doing historical comparisons of teams, it is better not to create and destroy teams often, which is more likely to happen with small teams. For example, through historical reports, the WebCenter manager may be able to predict how agents will perform around the Christmas holidays. If teams are very small, this comparison would be much harder.

Associate Teams with Task Types

Once the task types and teams are defined. it is rime to decide which teams should service each task type. Usually a task type will have primary teams, which are the "first line of defense" for a task type. These are the agents who are probably best qualified to handle the tasks. Then there is usually a set of backup teams for task type. If a customer waits too long, then the customer gets placed in queue for the backup teams. These could handle the task, but are not the first choice. Using backup agents allows the customer's task to be answered in a reasonable amount of time by someone who can probably help.

Decide the Hours of Operation

For each task type, the hours that that task type will accept tasks needs to be defined. The WebACD can be programmed to turn escalations on and off so if a request comes in after hours, the WebACD will send a message to the customer saying that the WebCenter is closed. If all task types have the same hours of operation, then that will simply this customization, but for many environments that is not possible.

Building Scripts

This section describes how to write Plaid scripts. Rather than focus on the exact syntax for Plaid, this section will focus on the usual components of a Plaid script.

Write a Basic Plaid Script

A script usually has the following components shown in Table II:

TABLE II

Greeting
Queue for primary teams
Wait
Queue for backup teams
Wait indefinitely

This section will describe how to build a script with each of those sections. Table III shows a basic script that has all of those sections.

TABLE III

Say("Thank you for contacting Acme Support.")
Say("Continue browsing. When an agent arrives, you will")
Say("be notified through a pop-up in your browser.")
ACD. GetTeam("PrimaryTeam1 ").Enqueu( )
ACD. GetTeam("PrimaryTeam2").Enqueue( )
Sleep(30)
Say("Please continue to wait . . . ")
ACD.GetTeamr'BackupT earn").Enqueue( )
while true
    Sleep(30)
    Say("Please continue to wait. . . . ")
wend The following sections describe factors that should be considered when writing a script like this one.

Greeting

A greeting should reassure the customer that he has been placed in a queue for agents. The concept of a web-based call center is very new, so customers may be unsure of themselves as they try to use the WebCenter at first. The customer should be told they are in a queue for an agent and that they can use the right hand pane of their window for browsing. He can also be told to expound on his question in the transcript window. Then when the agent arrives, the customer will have fully explained the problem and the agent can read it hopefully handle the task more quickly.

Queue for Primary Teams

In the script above, customers will be placed in queue for the teams PrimaryTeam1 and PrimaryTeam2. When the customer is placed in queue for PrimaryTeam1, if an agent is available in that team to service the customer, then the script will terminate immediately and the customer will be assigned to that agent. If an agent is not available in PrimaryTeam1, then the script will continue to the next line and place the task in queue for PrimaryAgent2. Once the task is in queue for both teams, the task will be answered by the first agent who becomes available in either team. When that happens, execution of the script will terminate.

Wait

After placing the customer in queue for the primary teams, the typical script will wait for an agent in those teams to answer the task. In this example, the script waits for 30 seconds. If, after 30 seconds, an agent from PrimaryTeam1 or PrimaryTeam2 doesn't answer, then the customer will be played a message that he should continue to wait and then proceed to queuing for the backup teams. The amount of time that the customer should wait depends on the service level requirements for the particular task type. If the time set here is x seconds, then the script is saying that the customer should be willing to wait an extra x seconds to have someone with more expertise answer the task.

Queue for Backup Teams

After waiting for an agent in one of the primary teams to answer, the task should be queued for the backup teams. When the task is placed in queue for the backup teams, the customer goes to the end of the queue for the backup team. To make the customer jump ahead of other customers waiting in that queue, priority can be used, which is described below. Once the customer is in queue for the primary and backup teams, the first agent in any of those teams who becomes available will be assigned to the customers.

Wait Indefinitely

If a Plaid script ends, then the customer will be disconnected and the task will be finished. As a result, the Plaid script must wait for someone from one of the primary or backup teams to handle the task. There are two ways to do this. The way shown above, with an infinite while loop will give the customer feedback every 30 seconds that he is still in queue for an agent. This may be particularly important since there are several web-based call centers on the market that drop customers so they wait indefinitely and never get serviced by an agent. However, giving customers notification every few seconds is less efficient in the WebACD and for WebCenters with very large call volumes, it is probably better to just say Sleep(−1), which will wait indefinitely.

Installing Scripts

Once the script is written, it should be installed. To install a script, it should be associated with a task type. Then when an escalation comes in for that task type, the script will be executed. Note that as scripts are created, each edit creates a new version. Then to make the system execute the script, the appropriate version must be activated. All of this can be done while the WebCenter is running. If the new version doesn't work, then the WebCenter administrator can activate the previous version so the WebCenter can continue operation as usual.

Hours of Operation

There are two ways to turn off escalations to the WebACD. First, through the administration pages, escalations can be redirected to a different page that tells the customer that the WebCenter is closed. The page can be specified so customers can receive different messages based on why the WebCenter is closed. For example, if the WebCenter is closed for a holiday, the closed page could say that. The second mechanism is through Plaid, which will be described here.

To make the WebCenter open from 8 AM until 5 PM, Monday, through Friday, the greeting described above would be preceded by the following Plaid script.

ifWeekday(Now( )) < 1 OR Weekday(Now( )) > 6 OR
Time(Now( )) < #800# OR Time(Now( )) > #1700# then
Say("I'm sorry, we are closed. Please come back.")
Sleep(10)
else
    rest of the script
endif This script will test to see if it is Sunday or Saturday. If it isn't then it makes sure it is between 8 AM and 5 PM. If it isn't, then it prints out a message saying it is closed and waits 10 seconds before terminating the script to give the customer a chance to read the message. Otherwise the script executes as normal.

Personalization

Plaid can also be used to personalize the service that customers receive. This may be something as simple as placing their first name in the greeting or something as complicated as changing how routing is done based on how much service the customer has paid for. The former can be done by default. The latter requires writing a servlet to create customers with special attributes.

To just print the customer's name, the following script can be used.

```
if ACD.GetCustomer( ).GetValue("firstname") <> "" then
    Say{"Hello" & ACD.GetCustomer( ).GetValue("firstname"));
endif
``` endif

The test is necessary because firstname is not a required field, so the customer may not have entered it when creating the customer record.

To test for the service the customer has paid for, you might do something like if

```
ACD.GetCustomer( ).GetValue("service") ="gold" then
    Say("You are a gold customer")
    ACD.GetTeam("GoldTeam").Enqueue(high)
else
    Say("You are a regular customer")
    ACD. GetTeam("RegularTeam").Enqueue( )
endif
```

This code will enqueue the customer with high priority for the GoldTeam if he is a gold customer and for the RegularTeam with normal priority if he is not. In order to do something like this, the customer servlet would have to be modified to add the field "service" to the user record. Acuity's consulting services can assist you with that process.

Using Priority

In the WebACD, there are five levels of priority that it uses for queuing tasks, low, normal, high, urgent and system. The bottom four levels, low, normal, high, and urgent, can be set and changed in the Plaid script using the Enqueue( ) function. The highest priority, system, is reserved for the WebACD. It is the priority assigned to transferred tasks. In the WebACD, if two tasks are queued for a team and one has higher priority, that task will always be answered before a task with lower priority. This is a very important consideration when using priority because it can result in "starvation." If too many high priority tasks are assigned to one team, then the lower priority tasks queued for that team will never get answered.

Here is an example of using priority when queuing. Assume this is a script for regular customers who often spend money.

```
ACD.GetTeam("GreatSales").Enqueue( )
Sleep(20)
ACD. GetTeam("Genera 1 Sales").Enqueue(high)
Sleep(-1)
```

This script will enqueue the customer for the team GreatSales and then wait for 20 seconds. If an agent doesn't answer, then he will be queued for GeneralSales with high priority, which means that customer will be serviced before the general sales customers are.

Plaid Syntax

The following sections describe exactly the syntax that can be used in a Plaid script.

Expressions

An expression is the most basic construct in Plaid. An expression is a collection of symbols in Plaid that can be evaluated into one value. In Plaid, values have different types. This allows Plaid to be what is called a "type safe language." In other words, when a number is expected, you can't use a string of characters instead.

Types

Plaid has the following types defined.
Long—A Long represents a 32-bit integer. Use this type to represent integers such as I, 30045, or −245.
Double—A Double represents a double precision floating point number, which means you can use it to represent values like 4.6,3.14156, or −2.45e10.
String—A String is a sequence of characters such letters, numbers, and spaces. Use values of type String to represent messages like "Please continue to wait."
DateTime—A DateTime represents a specific date and time. In Plaid, DateTime values can be accurate to the second. Use values of type DateTime to represent values such as #7/23/73 5:03# for Jul. 23, 1973 and 5:03 AM or #18:24# for 6:24 PM.
Boolean—A Boolean represents true or false.
ACD—A value of type ACD represents the entire ACD. This type is used to get teams that are defined on the ACD, defined agents, etc.
Team—A value of type Team represents a team defined on the WebACD. This type is basically used to enqueue and dequeue tasks from teams.
Customer—A value of type Customer represents the customer that has escalated to create the task that is being executed for this script. This value is used to retrieve attributes defined on the customer.
Agent—A value of type Agent represents an agent defined on the WebACD. This type is basically used to enqueue and dequeue tasks from individual agents.

These types form the foundation for Plaid. Based on values of these types, expressions can be built in Plaid.

Operators

Plaid supports the following operators:
NOT value—Boolean NOT. If the value is true, the value of the expression is false. If the value is false, the value of the expression is true.
value AND value—Boolean AND of the two values. value OR value—Boolean OR of the two values.
−value−Unary minus.
value*value−
value/value−
value+value−
value−value−
value=value−
value<>value−Not equal
value<value−
value<=value−
value>value−
value>=value−
value & value−String concatenation.

In addition, Plaid supports parentheses, so expressions can be combined to [on expressions such as (1+3)/2>5.

Functions

Plaid supports the following global functions.

Now
Syntax: Now( )
Arguments: none
Return Value: A Date Time value representing the current local date and time.
Purpose: This function returns the current date and time of the server running the WebACD. The value returned is local time, so the time zone of the server determines the value returned.

UTC
Syntax: UTC( )
Arguments: none
Return Value: A DateTime value representing the current Coordinated Universal Time.
Purpose: This function returns the current date and time of the server running the WebACD. Since it returns Coordinated Universal Time, the time zone setting on the server does not impact the value returned.

DateValue
Syntax: DateValue(srcDateTime)
Arguments: srcDateTime—A value of type DateTime that you would like converted into a date.
Return Value: A Date Time value representing just the date portion of srcDateTime.
Purpose: In a Plaid script, it is sometimes useful to compare two dates, without respect to time. For example, one might want to test "DateValue(Now( ))=#12/25/98#" and perform different actions if it is Christmas day. To facilitate this comparison, DateValue( ) converts the time portion to midnight so if you compare two dates, then they should both have times of midnight.

TimeValue
Syntax: TimeValue(srcDateTime)
Arguments: srcDateTime—A value of type DateTime that you would like converted into a time.
Return Value: A DateTime value representing just the time portion of srcDateTime.
Purpose: In a Plaid script, it is sometimes useful to compare two times, without respect to date. For example, one might want to test "TimeValue(Now( ))>#17:00#" and perform different actions if it is after 5 pm. To facilitate this comparison, TimeValue( ) converts the date portion to an invalid date if you compare two times, their dates will be equal and just times will be compared.

Day
Syntax: Day(srcDateTime)
Arguments: srcDateTime—A value of type DateTime from which you would like to extract the day in the month.
Return Value: A value of type Long representing the day in the month of srcDateTime. This value is in the range 1-31.
Purpose: This function is used to just retrieve the day in the month from a given DateTime, which can be useful in producing custom formatted dates or comparisons.

Month
Syntax: Month(srcDateTime)
Arguments: srcDateTime—A value of type DateTime from which you would like to extract just the month.
Return Value: A value of type Long representing the month of srcDateTime. This value is in the range 1-12.
Purpose: This function is used to just retrieve the month from a given DateTime, which can be useful in producing custom formatted dates or comparisons.

Year
Syntax: Year(srcDateTime)
Arguments: srcDateTime—A value of type DateTime from which you would like to extract the year.
Return Value: A value of type Long representing the year of srcDateTime. This value is a four digit year.
Purpose: This function is used to just retrieve the year from a given DateTime, which can be useful in producing custom formatted dates or comparisons.

Hour
Syntax: Hour(srcDateTime)
Arguments: srcDateTime—A value of type DateTime from which you would like to extract just the hour.
Return Value: A value of type Long representing the hour of srcDateTime. Since Plaid represents times using the 24 hour clock, this value is in the range 0-23.
Purpose: This function is used to just retrieve the hour from a given DateTime, which can be useful in producing custom formatted dates or comparisons.

Minute
Syntax: Minute(srcDateTime)
Arguments: srcDateTime—A value of type DateTime from which you would like to extract just the minute.
Return Value: A value of type Long representing the minute of srcDateTime. This value is in the range 0-59.
Purpose: This function is used to just retrieve the minute from a given DateTime, which can be useful in producing custom formatted dates or comparisons.

Second
Syntax: Second(srcDateTime)
Arguments: s rcDateTime—A value of type DateTime from which you would like to extract the second.
Return Value: A value of type Long representing the second of srcDateTime. This value is in the range 0-59.
Purpose: This function is used to just retrieve the second from a given DateTime, which can be useful in producing custom formatted dates or comparisons.

Weekday
Syntax: Weekday(srcDateTime)
Arguments: srcDateTime—A value of type DateTime from which you would like to extract the day of the week.
Return Value: A value of type Long representing the day of the week of srcDateTime. This value is in the range 0-6 where 0 represents Sunday and 6 represents Saturday.
Purpose: This function is used to just retrieve the day of the week from a given DateTime, which can be useful in comparisons.

WeekdayName
Syntax: WeekdayName(srcDateTime)
Arguments: srcDateTime—A value of type DateTime from which you would like to extract the day of the week.
Return Value: A value of type String representing the day of the week of srcDateTime. This value is one of the values "Sunday," "Monday," "Tuesday," "Wednesday," "Thursday," "Friday," or "Saturday."
Purpose: This function is used to just retrieve the day of the week from a given DateTime, which can be useful in custom date formatting.

Fix
Syntax: Fix(srcDouble)
Arguments: srcDouble—A value of type Double that you would like to truncate.
Return Value: A value of type Long, which is the value of srcDouble without fraction.

Purpose: This function is used to truncate doubles into longs, which just removes the portion of the double after the decimal. Fix and Int are similar, but differ in the way they treat negative numbers. Fix truncates toward zero, so Fix (−8.4)=−8. Likewise, Int truncates away from zero, so Int (−8.4)=−9.

Int

Syntax: Int(srcDouble)

Arguments: srcDouble—A value of type Double that you would like to truncate.

Return Value: A value of type Long, which is the value of srcDouble without fraction.

Purpose: This function is used to truncate doubles into longs, which just removes the portion of the double after the decimal. Fix and Int are similar, but differ in the way they treat negative numbers. Fix truncates toward zero, so Fix (−SA)=−8. Likewise, Int truncates away from zero, so Int (−8.4)=−9.

This function is broken. It functions exactly like Fix.

Sleep

Syntax: Sleep(seconds)

Arguments: seconds—A value of type Long representing the number of seconds you would like the script to wait for an agent to be assigned.

Return Value: none (Void)

Purpose: This function is used to put pauses in a script. Typically a Sleep is placed after one or more enqueue statements, waiting for an agent to be assigned to the task. If a value of −1 is sent to Sleep, then it will sleep indefinitely. However, a script should never end with just Sleep (−1). Instead it should have the lines While true
   Sleep(−1)
Wend Those lines will ensure the script is not terminated prematurely in certain cases.

Trace

Syntax: Trace(message)

Arguments: message—A String value representing a message to be written to the log file.

Return Value: none (void)

Purpose: This function is used write messages to the WebACD log file from within Plaid. For example, you may want to log when certain customers log in or when certain customers wait more the a particular amount of time. In order for this feature to work, the trace level on the WebACD must be at 1000 or above.

CDbl

Syntax: CDbl(srcInt)

Arguments: srcInt—A Long value representing an integer you would like to convert to Double.

Return Value: A Double value representing srcInt as a Double.

Purpose: This function is used to convert an integer into a floating point number, which can be important in maintaining accuracy in division and other arithmetic operations. Note that this function is often called implicitly. Any rime a value of type Long is used when a value of type Double is expected, this function is called. This also applies to binary operators where one operand is of type Long and the other of type Double. This function should probably take a string, also, CStr Syntax: CStr(srcLong), CStr(srcDouble), CStr(srcString), CStr(srcDateTime), CStr(srcBoolean) Right now customer and team are also supported, but they don't do anything useful. If you pass an agent, the server crashes. (Will be fixed soon,)

Arguments: A value you would like converted to a string.

Return Value: A String value with the string representation of the specified value.

Purpose: To produce a string representation that can be displayed to the user or placed in a trace. Note that this function is called implicitly any time the concatenation operator (&) is used on non-string types.

Say

Syntax: Say(htmlString)

Arguments: htmlString—A String value representing text that will be displayed in the customer client. This string can be HTML, which allows you to put graphics and formatting in your message.

Return Value: none (void)

Purpose: This function is used to push text to the customer client. Since the text can be HTML, it is also used to liven up the customer interface.

PushURL

SyntaX: PushURL(urlString)

Arguments: urlString—A String value representing a URL that will be pushed to the customer.

Return Value: none (void)

Purpose: This function is used to push URLs to the customer via the Plaid script. The URLs will appear in the transcript just like URLs pushed by the agent. You can use this to push the customer advertisements or forms they should fill out while waiting for an agent.

Objects

The following objects in Plaid are defined to access and control various parts of the system.

ACD

The object ACD is a global object of type ACD that is the used to retrieve most of the objects in Plaid. It supports the following methods.

GetTeam

Syntax: ACD.GetTeam(teamName)

Arguments: teamName—A String value representing the name of the team to retrieve.

Return Value: A value of type team with the specified name or a value of type team of the default team if there is no team by teamName.

Purpose: This function is used to retrieve teams from the WebACD so tasks can be placed in a queue for the team (see type Team below). If the specified team name does not exist, then a message will be written to the customer client saying the team was not found and which script and version is running. This is so the administrator can run the script and immediately identify incorrect team names. If the team is not found, the default team will be used and processing will continue.

GetCustomer

Syntax: ACD.GetCustomer( )

Arguments: none

Return Value: A value of type Customer representing the customer who is running the current task.

Purpose: This function is used to retrieve the customer who escalated so you can get attribute values off of that customer record.

GetAgent

Syntax: ACD.GetAgent(agentName)

Arguments: agentName—A value of type string representing the name of the agent you would like to retrieve.

Return Value: A value of type Agent representing the agent with the specified name.

Purpose: This function is used to retrieve an agent so the task can be placed in a queue for that agent.

Team

A team object is retrieved using ACD.GetTeam( ). Once you have that object, you can execute the following commands on the team.

Enqueue

Syntax: team.Enqueue( )

Arguments: team—A value of type Team.

Return Value: none (void)

Purpose: This function is used to place a customer in queue for a team. Using this function, the customer will be placed in the queue using normal priority, at the tail end of the queue.

Syntax: team.Enqueue(priority)

Arguments: team—A value of type Team.

priority—One of the strings low, normal, high, or urgent.

Return Value: none (void)

Purpose: This function is used to place a customer in queue for a team. Using this function, the customer will be placed in the queue using the specified priority. Priority low is the lowest priority and priority urgent is the highest priority. In addition there is one higher priority called "system" that is not available through Plaid. That priority is used in transfer. All tasks with higher priority will be serviced before tasks with lower priority. For this reason, priority must be used very carefully. If a very large number of urgent priority tasks are assigned to the queue. then low, normal, and high priority tasks may never get answered. A task may be enqueued for different teams, each with a different priority.

Dequeue

Syntax: team.Dequeue( )

Arguments: team—A value of type T earn.

Return Value: none (void)

Purpose: This function removes the task from the queue of the specified team. If a customer waits too long, then you may want to remove that customer from the queue and assign the customer to a different queue.

Agent

The Agent object is used to place customers in queue for one particular agent. The methods on this object are much like the methods on the object Team.

Enqueue

Syntax: agent. Enqueue( )

Arguments: agent—A value of type Agent.

Return Value: A value of type Long that represents whether or not the enqueue was successful.

If the agent is not signed on, then Enqueue will return 0 and will do nothing. Otherwise it will return a non-zero value and queue the customer for the specified agent.

Purpose: This function is used to place a customer in queue for the specified agent. Using this function, the customer will be placed in the queue using normal priority, at the tail end of the queue. Queuing for agents is done using a barbershop model. As in an old style barbershop, if customer Pat wants to wait for one particular barber, then all customers that arrive before Pat must be serviced before Pat can be considered. Once Pat can be considered, Pat will be serviced as soon as the barber is ready. Note that this implies that a customer who arrived after Pat could be serviced before Pat is. If this behavior is undesirable and you would rather have Pat serviced right away, then Pat can be queued at a higher priority.

Syntax: agent.Enqueue(priority)

Arguments: agent—A value of type Agent.

priority—One of the strings low, normal, high, or urgent.

Return Value: A value of type Long that represents whether or not the enqueue was successful.

If the agent is not signed on, then Enqueue will return 0 and will do nothing. Otherwise it will return a non-zero value and queue the customer for the specified agent.

Purpose: This function is used to place a customer in queue for an agent. Priority in this function works just like priority when queuing for the team.

Dequeue

Syntax: agent.Dequeue( )

Arguments: agent—A value of type Agent.

Return Value: none (void)

Purpose: This function removes the task from the queue of the specified agent. If a customer waits too long, then you may want to remove that customer from the queue and assign the customer to a different queue.

Customer

The type Customer is used to represent information about the customer who has escalated.

GetValue

Syntax: customer.GetValue(key)

Arguments: customer—A value of type Customer.

key—A value of type String that represents the key of the value that needs to be retrieved.

Return Value: A value of type String that goes with the key specified. If the key was not found, then the empty string is returned.

Purpose: This function is used to retrieve information about the customer. A customer record is a collection if key-value pairs that can be extended by writing a ComHub or CIS servlet. This function allows you to retrieve those values so different routing can be done based on the customer information.

Statements

A Plaid script is a collection of statements. A statement can simply be an expression as defined above or one of the control flow statements in the following sections.

While

The while statement is used to execute a certain piece of code until a condition is true. The syntax is While expr body Wend The code represented by body will be executed as long as expr is true. Note that expr must evaluate to a value of type Boolean. This statements is particularly useful for making customers wait indefinitely by using "While true . . . "

If

An If statement is used to test a condition and then chose a section of code to execute. The syntax is

```
If expr then
then-block
Endif
or
If expr then
then-block
Else
else-block
Endif
```

The code represented by then-block will be executed if expr is true. If expr is false and there is an Else, the else-block will be executed. Otherwise, processing the script will continue after the Endif. Note that expr must be a value of type Boolean.

Although the invention has been described with reference to particular embodiments thereof, these embodiments are merely illustrative of preferred embodiments of the invention. The scope of the invention is to be determined solely by the appended claims.

The invention claimed is:

1. An agent interface for an agent in a call center, wherein the call center places a customer in communication with an agent, the interface comprising
   a first indicator for indicating that a first customer is not waiting for a response from the agent; and
   a second indicator for indicating that a second customer is waiting for a response form the agent.

2. The agent interface of claim 1, wherein the first indicator is a first color and the second indicator is a second color.

3. The agent interface of claim 2, further comprising
   a third indicator for indicating that a customer has been waiting for an agent response for more than a predetermined time period.

4. An agent interface for an agent in a call center, wherein the call center places a customer in communication with the agent, the interface comprising
   an indicator for indicating the status of the customer, wherein the indicator is in a first state after the customer receives a response from the agent, wherein the indicator is in a second state after the customer sends a communication to the agent, and wherein the indicator is in a third state after a predetermined period of time elapses since the customer has sent a communication to the agent.

5. The agent interface of claim 4, wherein different colors are used to represent different states of the indicator.

6. The agent interface of claim 4, wherein different states are represented by audible means.

7. The agent interface of claim 5, wherein the first state is represented by the color green, wherein the second state is represented by the color yellow, and wherein the third state is represented by the color red.

* * * * *